United States Patent
Hsu et al.

(10) Patent No.: US 10,913,844 B2
(45) Date of Patent: Feb. 9, 2021

(54) PLASTICIZED THERMOSET RESIN, AND ASSOCIATED CURED RESIN, METHOD OF CURING, AND ARTICLE COMPRISING CURED RESIN

(71) Applicant: The University of Massachusetts, Boston, MA (US)

(72) Inventors: Shaw Ling Hsu, Amherst, MA (US); Jigneshkumar P. Patel, Amherst, MA (US); Subrajeet Deshmukh, Amherst, MA (US); Caixia Zhao, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 249 days.

(21) Appl. No.: 16/315,948

(22) PCT Filed: Jul. 7, 2017

(86) PCT No.: PCT/IB2017/054131
§ 371 (c)(1),
(2) Date: Jan. 7, 2019

(87) PCT Pub. No.: WO2018/008003
PCT Pub. Date: Jan. 11, 2018

(65) Prior Publication Data
US 2019/0309159 A1 Oct. 10, 2019

Related U.S. Application Data

(60) Provisional application No. 62/359,865, filed on Jul. 8, 2016.

(51) Int. Cl.
| | | |
|---|---|---|
| *C08L 61/06* | (2006.01) | |
| *C08K 5/00* | (2006.01) | |
| *C08K 5/18* | (2006.01) | |
| *C08K 5/3492* | (2006.01) | |
| *C08K 5/07* | (2006.01) | |

(Continued)

(52) U.S. Cl.
CPC ............... *C08L 61/06* (2013.01); *C08K 3/22* (2013.01); *C08K 3/30* (2013.01); *C08K 3/34* (2013.01); *C08K 5/00* (2013.01); *C08K 5/0016* (2013.01); *C08K 5/07* (2013.01); *C08K 5/09* (2013.01); *C08K 5/17* (2013.01); *C08K 5/18* (2013.01);
(Continued)

(58) Field of Classification Search
CPC ... C08L 61/06; C08L 2312/00; C08K 5/0016; C08K 5/18; C08K 5/3492
See application file for complete search history.

(56) References Cited

U.S. PATENT DOCUMENTS

| | | | |
|---|---|---|---|
| 2,201,321 A | 5/1940 | Robie et al. | |
| 2,665,261 A | 1/1954 | Baker | |

(Continued)

FOREIGN PATENT DOCUMENTS

| | | |
|---|---|---|
| CN | 103183921 A | 7/2013 |
| EP | 1497075 | 1/2005 |

(Continued)

OTHER PUBLICATIONS

Patel et al (Path to Achieving molecular dispersion in a Dense Reactive Mixure, Journal of Polymer Science, Part B: Polymer Physics, 2015, 53, 1519-1526) (Year: 2015).*
Allen et al., "Internal Rotation: The Infrared and Raman Spectra of Furfural"; Canadian Journal of Chemistry, vol. 33; 1955; pp. 1055-1061.
Baekeland; "On Soluble, Fusible, Resinous Condensation Products of Phenols and Formaldehyde"; Journal of Industrial and Engineering Chemistry—US, vol. 1; 1909; pp. 545-549.
Baekeland; "The Synthesis, Constitution, and Uses of Bakelite"; Journal of Industrial and Engineering Chemistry—US, vol. 1; 1909; pp. 149-161.

(Continued)

*Primary Examiner* — Doris L Lee
(74) *Attorney, Agent, or Firm* — Cantor Colburn LLP

(57) ABSTRACT

A curable composition includes a hydrogen-bonded prepolymer, a plasticizer, and, optionally, a crosslinking agent. The plasticizer includes a reactive plasticizer having structure (I), (II), or (III), wherein X is $-OR^1$, $-N(R^1)_2$, $-R^4-OR^1$, or $-R^4-N(R^1)_2$, wherein $R^1$ is independently at each occurrence hydrogen or $C_{1-6}$ alkyl, and $R^4$ is $C_{1-12}$ alkylene; y is zero or 1; z is zero or 1; $R^2$ is $C_{1-12}$ alkyl; and $R^3$ is $C_{1-12}$ alkyl when z is 1, or $R^3$ is $C_{1-12}$ alkyl or H when z is zero.

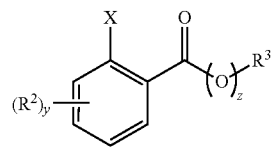

(I)

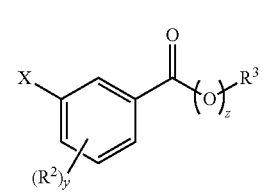

(II)

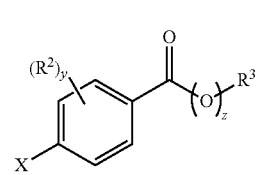

(III)

30 Claims, 6 Drawing Sheets

(51) Int. Cl.
  *C08K 3/30* (2006.01)
  *C08K 5/09* (2006.01)
  *C08K 5/17* (2006.01)
  *C08K 3/22* (2006.01)
  *C08K 3/34* (2006.01)

(52) U.S. Cl.
  CPC ........ *C08K 5/3492* (2013.01); *C08L 2312/00* (2013.01)

(56) References Cited

U.S. PATENT DOCUMENTS

| | | | |
|---|---|---|---|
| 2,825,638 | A | 3/1958 | Booth |
| 3,524,286 | A | 8/1970 | Wohrer |
| 3,891,408 | A | 6/1975 | Rowse et al. |
| 3,893,826 | A | 7/1975 | Quinan et al. |
| 3,904,559 | A | 9/1975 | Furness et al. |
| 4,426,484 | A | 1/1984 | Saeki et al. |
| 4,682,988 | A * | 7/1987 | Narayanan ............... B24D 5/16 51/298 |
| 5,032,642 | A | 7/1991 | Lemon et al. |
| 5,051,454 | A | 9/1991 | Lemon et al. |
| 5,340,888 | A | 8/1994 | Lemon et al. |
| 5,413,685 | A | 5/1995 | Ozawa et al. |
| 2013/0338288 | A1 | 12/2013 | Arnaud |
| 2015/0299471 | A1 | 10/2015 | Farnum |

FOREIGN PATENT DOCUMENTS

| | | |
|---|---|---|
| JP | 4973446 | 7/1974 |
| JP | 11106647 | 4/1999 |
| TW | 2024696 B | 3/1993 |
| WO | 02060985 A1 | 8/2002 |
| WO | 2002060985 A1 | 8/2002 |
| WO | 2014078947 A1 | 5/2014 |
| WO | 2015167758 A1 | 11/2015 |
| WO | 2016049479 A1 | 3/2016 |
| WO | 2018008003 A1 | 1/2018 |

OTHER PUBLICATIONS

Cairns et al.; "Hydrogen Bonding in Phenols"; Nature, vol. 196, No. 4854; Nov. 1962; pp. 535-537.
Dargaville et al., "Chemistry of Novolac Resins. II. Reaction of Model Phenols with Hexamethylenetetramine"; Journal of Polymer Science Part A: Polymer Chemistry; 1997; vol. 35, pp. 1389-1398.
Enns et al., "Time-Tempurature-Transformation (TTT) Cure Diagram: Modeling the Cure Behavior of Thermostats"; Journal of Applied Polymer Science; 1983; vol. 28; pp. 2567-2501.
Feger et al., "Properties of Partially Cured Networks. 2. The Glass Transition", Macromolecules, 1985, vol. 18, pp. 280-284.
Gutowsky et al., "Proton Magnetic Resonance Studies on Natural Rubber. II. Line Shape and T1 Measurements"; The Journal of Chemical Physics; 1957, vol. 27, pp. 534-542.
Harvey et al.; "Further Studies on Phenolic Hexamethylenetetramine Compounds"; Journal of Industrial and Engineering Chemistry—US, vol. 13; 1921; pp. 135-141.
Hatfield et al., "Solid-State NMR Study of the Hexamethylenetetramine Curing of Phenolic Resins"; Macromolecules, vol. 20; 1987; pp. 608-615.
Holmes et al., "Group Additivity Values for Estimating the Enthalpy of Formation of Organic Compounds: An Update and Reappraisal. 1. C, H, and O"; The Journal of Physical Chemistry A, 2011, vol. 115, pp. 10576-10586.
Holmes et al., "Group Additivity Values for Estimating the Enthalpy of Formation of Organic Compounds: An Update and Reappraisal. 2. C, H, N, O, S, and Halogens"; The Journal of Physical Chemistry A, 2012, vol. 116, pp. 7196-7209.
International Search Report; International Application No. PCT/IB2017/054131; International Filing Date: Jul. 7, 2017; dated Nov. 27, 2017; 7 pages.
Katovic et al., "Intermolecular Hydrogen Bonding in Novolaks"; Industrial & Engineering Chemistry Product Research and Development, 1985, vol. 24, pp. 179-185.
Mangion et al., "Relaxations in Thermosets. 7. Dielectric Effects During the Curing and Postcuring of Epoxide by Mixed Amines"; Macromolecules, vol. 53, No. 15; 1990; pp. 3687-3695.
Monk et al., "Computational and Experimental Study of Phenolic Resins:Thermal—Mechanical Properties and the Role of Hydrogen Bonding"; Macromolecules; 2015, vol. 48, pp. 7670-7680.
Patel et al., "An Analysis of the Role of Reactive Plasticizers in the Crosslinking Reactions of a Rigid Resin"; Polymer, vol. 107; 2016; pp. 12-18.
Patel et al., "Characterization of the crosslinking reactions in high performance adhesives"; International Journal of Adhesion and Adhesives, vol. 78, 2017, pp. 256-262.
Patel et al.; "An Analysis of the Role of Nonreactive Plasticizers in the Crosslinking Reactions of a Rigid Resin"; Journal of Polymer Science Part B: Polymer Physics, vol. 55; 2017; pp. 206-213.
Patel et al.; "Path to Achieving Molecular Dispersion in a Dense Reactive Mixture"; Journal of Polymer Science Part B: Polymer Physics, vol. 53; 2015; pp. 1519-1526.
Patel et al.; "Reduction of Volatile Organic Compounds in Reactive Formulations Used in Bonded Abrasives"; Polymer Science & Engineering; Univ. of Mass. (Amherst); Jan. 2016; pp. 1-17.
Patel, Jigneshkumar, "Analyses of Densely Crosslinked Phenolic Systems Using Low Field NMR" (2017). Doctoral Dissertations. 1116. https://scholarworks.umass.edu/dissertations_2/1116, 205 pages.
Rosenfeld et al., "Solvent Control of the Soft Angular Potential in Hydroxyl-ππ Hydrogen Bonds: Inertial Orientational Dynamics"; The Journal of Physical Chemistry B, vol. 113; 2009; pp. 13300-13307.
Sprung; "A Summary of the Reactions of Aldehydes With Amines"; Chemical Reviews, 1940, vol. 26, 297-338.
V. R. Landi et al., "The Glass Transition in Novolac Phenolic Molding Compounds and the Kinetics of Its Development During Cure and Postcure. I"; Advances in Polymer Technology; 1987; vol. 7; pp. 49-57.
V. R. Landi et al., "The Glass Transition in Novolac Phenolic Molding Compounds and the Kinetics of Its Development During Cure and Postcure. II"; Advances in Polymer Technology; 1987; vol. 7; pp. 209-218.
Written Opinion; International Application No. PCT/IB2017/054131; International Filing Date: Jul. 7, 2017; dated Nov. 27, 2017; 8 pages.
Zhang et al. "The chemistry of novolac resins:3.13C and ISN n.m.r, studies of curing with hexamethylenetetramine"; Polymer; 1997; vol. 38, pp. 5835-5848.
Zhang et al., "The chemistry of novolac resins—V. Reactions of benzoxazine intermediates"; Polymer; 1998, vol. 39, pp. 399-404.
Zhang et al., "The chemistry of novolac resins—VI. Reactions between benzoxazine intermediates and model phenols"; Polymer; 1998, vol. 39, pp. 405-412.

\* cited by examiner

PLASTICIZED THERMOSET RESIN, AND ASSOCIATED CURED RESIN, METHOD OF CURING, AND ARTICLE COMPRISING CURED RESIN

CROSS REFERENCE TO RELATED APPLICATIONS

This application is a National Stage application of PCT/IB2017/054131, filed Jul. 7, 2017, which claims the benefit of U.S. Application No. 62/359,865, filed Jul. 8, 2016, both of which are incorporated by reference in their entirety herein.

BACKGROUND

For many thermoset systems, in order to produce a cured product with the desired mechanical properties, it is necessary to induce reactions of the thermoset with itself and/or of the thermoset with a curing or crosslinking agent. For example, reactants can differ in molecular weight, inter-molecular interactions within and between reactants, and inter-molecular interactions between reactants and solvents or plasticizers. Reaction kinetics and reaction products of multi-component systems are difficult to predict when the reaction mixture is not homogeneous (that is, when it includes at least two phases).

One category of such systems involves the reaction of a hydrogen-bonded thermoset resin with itself, particularly when the resin is solid or viscous under the reaction conditions. Another category of such systems involves the reaction of a hydrogen-bonded thermoset resin, and a crosslinking agent with low solubility in the resin. For example, a thermoset system can include a phenol-formaldehyde resin and a hexamethylenetetramine (HMTA; CAS Registry Number 100-97-0) crosslinking agent. Although this combination was first introduced in the late 1920s, the extreme rigidity of its cured product has hindered a detailed analysis of the crosslinking reaction. H. Baekeland, *J. Ind. Eng. Chem.-US*, 1909, vol. 1, pp. 149-161; L. H. Baekeland, *J. Ind. Eng. Chem.-US*, 1909, vol. 1, pp. 545-549; M. Harvey, L. H. Baekeland, *J. Ind. Eng. Chem.-US*, 1921, vol. 13, pp. 135-141. Even before crosslinking, the phenol-formaldehyde resin exhibits extensive intra- and inter-molecular hydrogen bonding. The crosslinking agent HMTA is highly crystalline (>99% crystallinity) and has a high melting temperature of nearly 280° C. A. Knop and L. Pilato, "Phenolic resins: chemistry, applications, and performance: future directions", Springer-Verlag: Berlin; New York, 1985; A. Knop and W. Scheib, "Chemistry and Application of Phenolic Resins", Berlin; Springer-Verlag, 1983; Z. Katovic, M. Stefanic, *Ind. & Eng. Chem. Prod. Res. Dev.*, 1985, vol. 24, pp. 179-185; X. Q. Zhang, et al., *Polymer*, 1997, vol. 38, pp. 5835-5848; J. P. Patel, et al., *J. Polymer Sci. Part B: Polymer Phys.*, 2015, vol. 53, pp. 1519-1526. In order to induce a crosslinking reaction between the dissimilar phenol-formaldehyde resin and HMTA, a plasticizer, such as furfural, is typically used. Furfural has been shown to disrupt the hydrogen bonds of the resin, providing mobility to the resin, which in turn facilitates dissolution and dispersion of the crosslinking agent. J. P. Patel, et al., *J. Polymer Sci. Part B: Polymer Phys.*, 2015, vol. 53, pp. 1519-1526. Due to the rigidity of the phenyl ring of the phenol-formaldehyde resin, the glass transition temperature of the reaction product can rise quickly during the crosslinking reaction, rapidly creating a vitrified structure. V. R. Landi, J. M. Mersereau, *Adv. Polymer Tech.*, 1987, vol. 7, pp. 49-57; V. R. Landi, *Adv. Polymer Tech.*, 1987, vol. 7, pp. 209-218. When the vitrification point is approached, curing kinetics become diffusion controlled and strongly dependent on the local viscosity. J. B. Enns, J. K. Gillham, *J. App. Polymer Sci.*, 1983, vol. 28, pp. 2567-2591; C. Feger, W. J. MacKnight, *Macromolecules*, 1985, vol. 18, pp. 280-284; M. B. M. Mangion, G. P. Johari, *Macromolecules*, 1990, vol. 23, pp. 3687-3695. The plasticizer can decrease the local viscosity and increase the extent of crosslinking, which is important in the increase in cohesive strength.

As previously noted, one plasticizer commonly used with phenol-formaldehyde resin and HMTA is furfural, as described in U.S. Pat. No. 4,682,988 (Jul. 28, 1987) and U.S. Pat. No. 2,201,321 (May 21, 1940) for example. Notwithstanding many decades of use, furfural's mechanism of action has only recently begun to come into focus. Mechanistic studies suggest that furfural can disrupt various inter-molecular interactions including hydrogen bonding in the phenol-formaldehyde resin. Although the freed hydroxyl groups of the phenol-formaldehyde resin do not appear to participate directly in the crosslinking reaction, they may interact through hydrogen bonding to help dissolve the HMTA, thereby facilitating the crosslinking reaction. The solubility of HMTA in furfural is extremely low at less than two percent by weight, so furfural is not expected to dissolve HMTA directly. J. P. Patel, et al., *J. Polymer Sci. Part B: Polymer Phys.*, 2015, vol. 53, pp. 1519-1526.

Although furfural is an effective plasticizer for curing of hydrogen-bonded prepolymers such as phenol-formaldehyde resin, there is a desire for plasticizers that enable a higher extent of crosslinking, or a higher extent of polymerization, or both. It would be a further advantage if the plasticizer could offer improved health and safety characteristics.

BRIEF SUMMARY

One embodiment is a curable composition, comprising: a hydrogen-bonded prepolymer; a reactive plasticizer; and, optionally, a crosslinking agent; wherein the reactive plasticizer has structure (I), (II), or (III),

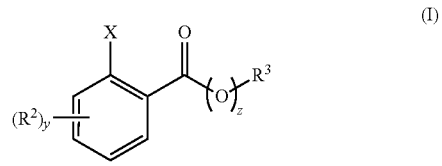

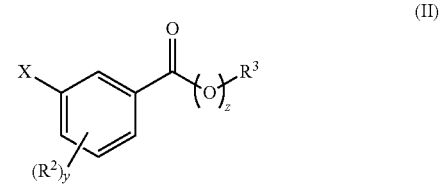

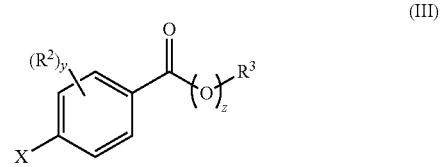

wherein X is $-OR^1$, $-N(R^1)_2$, $-R^4-OR^1$, or $-R^4-N(R^1)_2$, wherein $R^1$ is independently at each occurrence hydrogen or $C_{1-6}$ alkyl, and $R^4$ is $C_{1-12}$ alkylene; y is zero or 1; z is zero or 1; $R^2$ is $C_{1-12}$ alkyl; and $R^3$ is $C_{1-12}$ alkyl when z is 1, or $R^3$ is $C_{1-12}$ alkyl or H when z is zero.

Another embodiment is a method of forming a cured resin, the method comprising curing the curable composition above, in any of its variations.

Another embodiment is a method of forming a cured resin, the method comprising: reacting a hydrogen-bonded prepolymer and, optionally, a crosslinking agent, in the presence of a plasticizer; wherein the plasticizer comprises a reactive plasticizer having structure (I), (II), or (III),

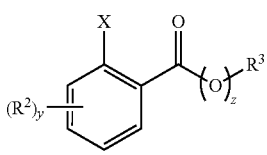
(I)

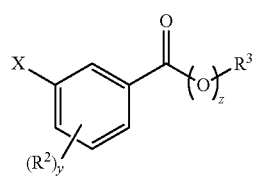
(II)

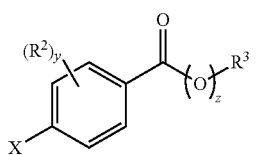
(III)

wherein X is $—OR^1$, $—N(R^1)_2$, $—R^4—OR$, or $—R^4—N(R^1)_2$, wherein $R^1$ is independently at each occurrence hydrogen or $C_{1-6}$ alkyl, and $R^4$ is $C_{1-12}$ alkylene; y is zero or 1; z is zero or 1; $R^2$ is $C_{1-12}$ alkyl; and $R^3$ is $C_{1-12}$ alkyl when z is 1, or $R^3$ is $C_{1-12}$ alkyl or H when z is zero.

Another embodiment is a cured resin obtained by the method above, in any of its variations, and an article including the cured resin.

Another embodiment is a crosslinked resin, comprising: a hexamethylenetetramine-crosslinked phenol-formaldehyde resin; and a crosslinking structure derived from a reactive plasticizer having structure (I), (II), or (III),

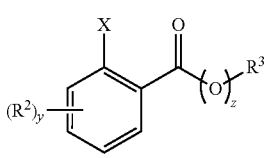
(I)

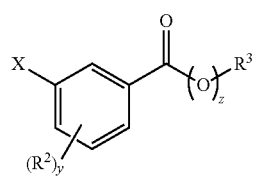
(II)

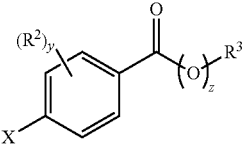
(III)

wherein X is $—OR^1$, $—N(R^1)_2$, $—R^4—OR$, or $—R^4—N(R^1)_2$, wherein $R^1$ is independently at each occurrence hydrogen or $C_{1-6}$ alkyl, and $R^4$ is $C_{1-12}$ alkylene; y is zero or 1; z is zero or 1; $R^2$ is $C_{1-12}$ alkyl; and $R^3$ is $C_{1-12}$ alkyl when z is 1, or $R^3$ is $C_{1-12}$ alkyl or H when z is zero.

Another embodiment is an article comprising the crosslinked resin in any of its variations.

These and other embodiments are described in detail below.

DETAILED DESCRIPTION OF THE INVENTION

Figure 1:
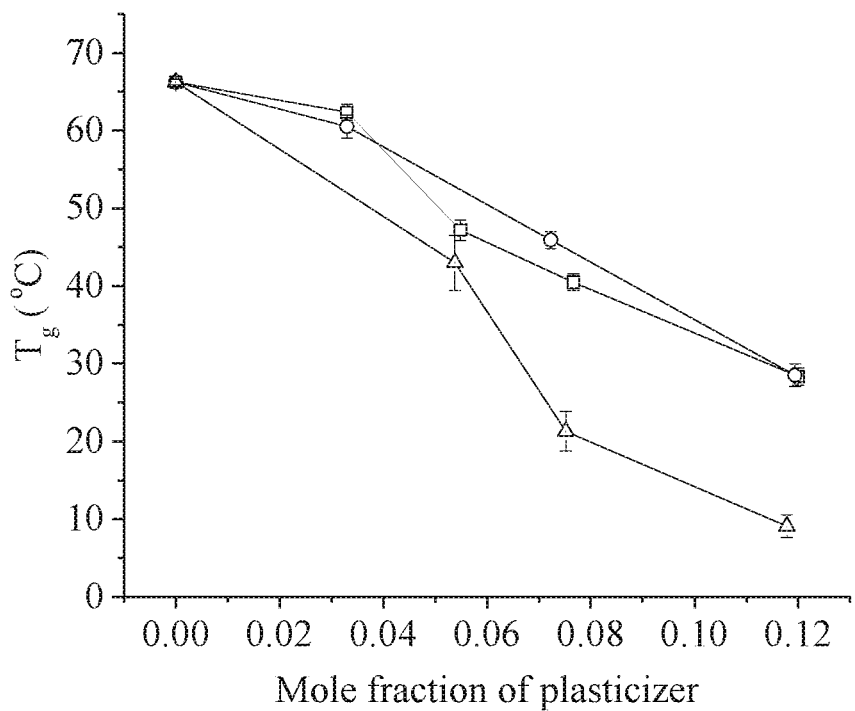
FIG. 1 is a graphical illustration of glass transition temperature as a function of the mole fraction of plasticizer, where the circles represent methyl anthranilate, the squares represent furfural, and the triangles represent furfuryl alcohol.

The present inventors have determined that certain reactive plasticizers are effective plasticizers for the reaction of a hydrogen-bonded prepolymer with itself, and, optionally, a crosslinking agent. As used herein, the term "reactive plasticizer" refers to a plasticizer that is capable of reacting with at least one of the hydrogen-bonded prepolymer, the crosslinking agent, and a reaction product of the hydrogen-bonded prepolymer and the crosslinking agent. The present reactive plasticizer promotes a greater extent of curing and crosslinking than does furfural.

In an embodiment, a curable composition (also referred to herein as a thermosetting composition or a plasticized thermosetting composition), comprises: a hydrogen-bonded prepolymer; a reactive plasticizer; and, optionally, a crosslinking agent; wherein the reactive plasticizer has structure (I), (II), or (III),

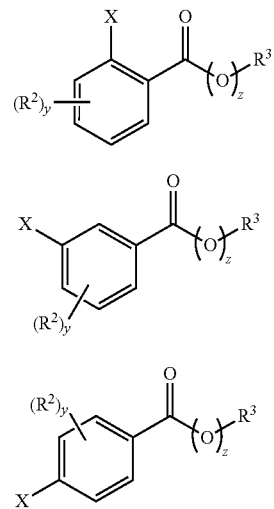

wherein X is $-OR^1$, $-N(R^1)_2$, $-R^4-OR^1$, or $-R^4-N(R^1)_2$, wherein $R^1$ is independently at each occurrence hydrogen or $C_{1-6}$ alkyl, and $R^4$ is $C_{1-12}$ alkylene; y is zero or 1; z is zero or 1; $R^2$ is $C_{1-12}$ alkyl; and $R^3$ is $C_{1-12}$ alkyl when z is 1, or $R^3$ is $C_{1-12}$ alkyl or H when z is zero. Preferably, $R^3$ is $C_{1-12}$ alkyl when z is zero.

It will be understood that in the thermoset resin art, a "curable composition" can alternatively be referred to as an "organic bonding material" or "binding material" or "resin bond material" or "thermosetting composition" among other terms.

One component of the composition is a hydrogen-bonded prepolymer. In some embodiments, the hydrogen-bonded prepolymer is a phenol-formaldehyde prepolymer, aniline-formaldehyde prepolymer, urea-formaldehyde prepolymer, phenolic hydroxyl containing epoxy prepolymer, cresol-aldehyde prepolymer, resorcinol-aldehyde prepolymer, urea-aldehyde prepolymer, melamine-formaldehyde prepolymer, polyester, polyimide, polyurethane (including polyester or polyether-based polyurethanes), epoxy resin, or a combination thereof. In some embodiments, the hydrogen-bonded prepolymer comprises a phenol-formaldehyde prepolymer. The phenol-formaldehyde prepolymer can be a novolac resin having a molar ratio of phenol to formaldehyde greater than 1:1, or a resol resin having a molar ratio of phenol to formaldehyde less than 1:1. Either the novolac resin or the resol resin can, optionally, have an elevated mole ratio of ortho to para linkages, for example an ortho to para mole ratio of 2:1 to 5:1 or higher.

In some embodiments, the hydrogen-bonded prepolymer has a glass transition temperature of 50 to 100° C., or 60 to 80° C., as determined by differential scanning calorimetry.

In addition to the hydrogen-bonded prepolymer, the composition comprises a reactive plasticizer. The present reactive plasticizer has structure (I), (II), or (III),

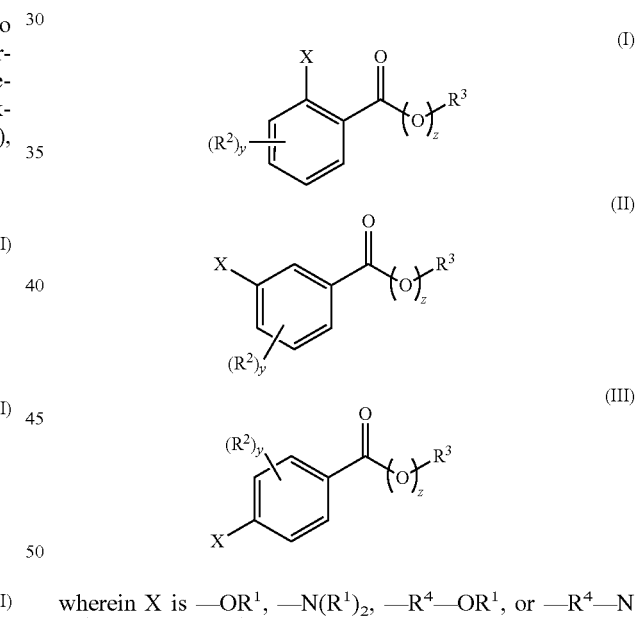

wherein X is $-OR^1$, $-N(R^1)_2$, $-R^4-OR^1$, or $-R^4-N(R^1)_2$, wherein $R^1$ is independently at each occurrence hydrogen or $C_{1-6}$ alkyl, and $R^4$ is $C_{1-12}$ alkylene; y is zero or 1; z is zero or 1; $R^2$ is $C_1$-12 alkyl; and $R^3$ is $C_{1-12}$ alkyl when z is 1, or $R^3$ is $C_{1-12}$ alkyl or H when z is zero, and preferably $R^3$ is $C_{1-12}$ alkyl.

As used herein, the term "alkyl" includes linear alkyl, branched alkyl, cyclic alkyl, alkyl groups having a combination of linear and cyclic groups, alkyl groups having a combination of branched and cyclic groups, or a combination thereof. Thus, $C_{1-12}$-alkyl includes $C_{1-12}$-n-alkyl, $C_{3-12}$ branched alkyl, and $C_{3-12}$ cyclic alkyl, among others. Specific examples of $C_{1-12}$-alkyl groups include, for example, methyl, ethyl, 1-propyl (n-propyl), 1-methylethyl (isopropyl), cyclopropyl, 1-butyl (n-butyl), 2-butyl, 2-methyl-1-propyl (sec-butyl), 1,1-dimethylethyl (tert-butyl), cyclobutyl, 1-methylcyclopropyl, 2-methylcyclopropyl, 1-pentyl (n-pentyl), 2-penyl, 3-pentyl, 2-methyl-1-butyl, 3-methyl-1-butyl, 2-methyl-2-butyl, 3-methyl-2-butyl, 2,2-dimethyl-1-propyl (neopentyl), cyclopentyl, 1-methylcyclobutyl, 2-methylcyclobutyl, 3-methylcyclobutyl, 1,2-dimethylcyclopropyl, 2,2-dimethylcyclopropyl, 2,3-dimethylcyclopropyl, 1-hexyl, 2-hexyl, 3-hexyl, 2-methyl-1-pentyl, 3-methyl-1-pentyl, 4-methyl-1-pentyl, 2-methyl-2-pentyl, 4-methyl-2-pentyl, 2-methyl-3-pentyl, 3-methyl-2-pentyl, 3-methyl-3-pentyl, 2,2-dimethyl-1-butyl, 3,3-dimethyl-1-butyl, 3,3-dimethyl-2-butyl, 2,3-dimethyl-1-butyl, 2,3-dimethyl-2-butyl, 1,2,2-trimethylcyclopropyl, 2,2,3-trimethylcyclopropyl, (1,2-dimethylcyclopropyl)methyl, (2,2-dimethylcyclopropyl)methyl, 1,2,3-trimethylcyclopropyl, (2,3-dimethylcyclopropyl)methyl, 2,2-dimethylcyclobutyl, 2,3-dimethylcyclobutyl, (1-methylcyclobutyl)methyl, 1,2-dimethylcyclobutyl, 2,3-dimethylcyclobutyl, (2-methylcyclobutyl)methyl, 1,3-dimethylcyclobutyl, 2,4-dimethylcyclobutyl, (3-methylcyclobutyl)methyl, 1-methylcyclopentyl, 2-methylcyclopentyl, cyclopentylmethyl, cyclohexyl, cycloheptyl, cyclooctyl, cyclononyl, cyclodecyl, cycloundecyl, cyclododecyl, n-heptyl, n-octyl, n-nonyl, n-decyl, n-undecyl, n-dodecyl, and 2-ethylhexyl.

The term "alkylene" refers to a divalent group and similarly includes linear alkylene, branched alkylene, cyclic alkylene, alkylene groups having a combination of linear and cyclic groups, alkylene groups having a combination of branched and cyclic groups, or a combination thereof.

In some embodiments, the reactive plasticizer has structure (I).

In some embodiments in which reactive plasticizer has structure (I), (II), or (III), each occurrence of X is —N(R$^1$)$_2$. Within these embodiments, each occurrence of R$^1$ can, optionally, be hydrogen.

In some embodiments in which reactive plasticizer has structure (I), (II), or (III), y is zero. In other embodiments in which reactive plasticizer has structure (I), (II), or (III), y is 1.

In some embodiments in which reactive plasticizer has structure (I), (II), or (III), z is zero. In other embodiments in which reactive plasticizer has structure (I), (II), or (III), z is 1.

Specific examples of the present reactive plasticizer include methyl anthranilate, ethyl anthranilate, 1-propyl anthranilate (propyl anthranilate, propyl 2-aminobenzoate), 2-propyl anthranilate (isopropyl anthranilate, isopropyl 2-aminobenzoate, propan-2-yl 2-aminobenzoate)), 1-butyl anthranilate (butyl anthranilate, butyl 2-aminobenzoate), 2-butyl anthranilate (isobutyl anthranilate, isobutyl 2-aminobenzoate, 2-methylpropyl 2-aminobenzoate), 1-pentyl anthranilate (pentyl 2-aminobenzoate), 2-pentyl anthranilate (2-pentyl 2-aminobenzoate), 3-pentyl anthranilate (3-pentyl 2-aminobenzoate), 3-methyl-1-butyl anthranilate (3-methylbutyl 2-aminobenzoate), 1-hexyl anthranilate (hexyl 2-aminobenzoate), 1-heptyl anthranilate (heptyl 2-aminobenzoate), 1-octyl anthranilate (octyl 2-aminobenzoate), 2-ethyl-1-hexyl anthranilate (2-ethylhexyl 2-aminobenzoate), 1-nonyl anthranilate (nonyl 2-aminobenzoate), 7-methyl-1-octyl anthranilate (7-methyloctyl 2-aminobenzoate), 1-decyl anthranilate (decyl 2-aminobenzoate), cyclohexyl anthranilate (cyclohexyl 2-aminobenzoate), menthyl anthranilate (menthyl 2-aminobenzoate), methyl 2-amino-3-methylbenzoate, methyl 2-amino-3-ethylbenzoate, methyl 2-amino-3-propylbenzoate, methyl 2-amino-3-isopropylbenzoate, methyl 2-amino-3-butylbenzoate, ethyl 2-amino-3-methylbenzoate, ethyl 2-amino-3-ethylbenzoate, ethyl 2-amino-3-propylbenzoate, propyl 2-amino-3-methylbenzoate, propyl 2-amino-3-ethylbenzoate, propyl 2-amino-3-propylbenzoate, butyl 2-amino-3-methylbenzoate, pentyl 2-amino-3-methylbenzoate, hexyl 2-amino-3-methylbenzoate, heptyl 2-amino-3-methylbenzoate, 2-ethylhexyl 2-amino-3-methylbenzoate, octyl 2-amino-3-methylbenzoate, nonyl 2-amino-3-methylbenzoate, decyl 2-amino-3-methylbenzoate, methyl 3-aminobenzoate, ethyl 3-aminobenzoate, propyl 3-aminobenzoate, butyl 3-aminobenzoate, 3-methylbutyl 3-aminobenzoate, pentyl 3-aminobenzoate, hexyl 3-aminobenzoate, heptyl 3-aminobenzoate, 2-ethylhexyl 3-aminobenzoate, octyl 3-aminobenzoate, nonyl 3-aminobenzoate, decyl 3-aminobenzoate, dodecyl 3-aminobenzoate, methyl 2-amino-4-methylbenzoate, methyl 2-amino-4-ethylbenzoate, methyl 2-amino-4-propylbenzoate, methyl 3-amino-4-propylbenzoate, ethyl 2-amino-4-methylbenzoate, ethyl 2-amino-4-ethylbenzoate, methyl 2-amino-5-methylbenzoate, methyl 2-amino-5-ethylbenzoate, methyl 2-amino-5-propylbenzoate, methyl 2-amino-5-butylbenzoate, methyl 3-amino-5-propylbenzoate, ethyl 3-amino-4-pentylbenzoate, ethyl 2-amino-5-methylbenzoate, ethyl 2-amino-5-ethylbenzoate, ethyl 2-amino-5-propylbenzoate, ethyl 2-amino-5-butylbenzoate, methyl 2-amino-6-methylbenzoate, methyl 2-amino-6-propylbenzoate, ethyl 2-amino-6-methylbenzoate, ethyl 2-amino-6-ethylbenzoate, methyl 4-aminobenzoate, methyl 4-amino-3-methylbenzoate, methyl 4-amino-3-ethylbenzoate, methyl 4-amino-3-ethylbenzoate, methyl 4-amino-2-propylbenzoate, ethyl 4-aminobenzoate, ethyl 4-amino-2-propyl benzoate, ethyl 4-amino-3-propyl benzoate, propyl 4-aminobenzoate, butyl 4-aminobenzoate, pentyl 4-aminobenzoate, 3-methylbutyl 4-aminobenzoate, hexyl 4-aminobenzoate, 2-ethylhexyl 4-aminobenzoate, octyl 4-aminobenzoate, nonyl 4-aminobenzoate, decyl 4-aminobenzoate, dodecyl 4-aminobenzoate, methyl 2-(1-aminoethyl)benzoate, methyl 2-(1-aminopropyl)benzoate, methyl 2-(2-aminopropyl)benzoate, methyl 2-(1-aminobutyl)benzoate, methyl 2-(2-aminobutyl)benzoate, ethyl 4-(4-aminohexyl)benzoate, methyl 4-(1-aminoethyl)benzoate, methyl 4-(1-aminopropyl)benzoate, methyl 4-(1-aminobutyl)benzoate, methyl 4-(1-aminohexyl)benzoate, methyl 4-(2-aminoethyl)benzoate, methyl 4-(2-aminopropyl)benzoate, methyl 4-(2-aminobutyl)benzoate, methyl 4-(3-aminopropyl)benzoate, methyl 4-(3-aminobutyl)benzoate, methyl 4-(4-aminobutyl)benzoate, methyl 3-(2-aminoethyl)benzoate, methyl 3-(2-aminopropyl)benzoate, methyl 3-(2-aminobutyl)benzoate, methyl 3-(3-aminopropyl)benzoate, methyl 2-(1-aminoethyl)benzoate, methyl 2-(1-aminopropyl)benzoate, methyl 2-(1-aminobutyl)benzoate, methyl 3-(1-aminoethyl)benzoate, methyl 3-(1-aminopropyl)benzoate, methyl 3-(1-aminobutyl)benzoate, methyl 2-(2-aminoethyl)benzoate, methyl 2-(2-aminopropyl)benzoate, methyl 2-(2-aminobutyl)benzoate, methyl 2-(3-aminopropyl)benzoate, methyl 2-(4-aminobutyl)benzoate, ethyl 2-(3-aminopropyl)benzoate, ethyl 3-(3-aminopropyl)benzoate, ethyl 4-(3-aminopropyl)benzoate, ethyl 4-(4-aminobutyl)benzoate, ethyl-4-(4-aminohexyl)benzoate, ethyl 4-(2-aminopropyl)benzoate, ethyl 4-(1-aminobutyl)benzoate, or a combination thereof.

In some embodiments, the reactive plasticizer comprises a $C_{1-12}$-alkyl anthranilate ($C_{1-12}$-alkyl 2-aminobenzoate).

In some embodiments, the reactive plasticizer comprises a $C_{1-12}$-n-alkyl anthranilate ($C_{1-12}$-n-alkyl 2-aminobenzoate).

In some embodiments, the reactive plasticizer comprises methyl anthranilate (methyl 2-aminobenzoate).

In some embodiments, the reactive plasticizer comprises a $C_{1-12}$-alkyl 2-aminophenyl ketone.

In some embodiments, the reactive plasticizer comprises an n-$C_{1-12}$-alkyl 2-aminophenyl ketone.

In some embodiments, the reactive plasticizer comprises methyl 2-aminophenyl ketone.

The plasticizer can, optionally, consist essentially of, or consist of, the reactive plasticizer. Alternatively, the plasticizer can comprise a plasticizer in addition to the present reactive plasticizer. The additional plasticizer can comprise glycerol, a $C_{1-12}$-alkyl benzoate, a $C_{1-12}$-alkyl phenyl ketone, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, benzyl alcohol, a $C_{1-12}$-alkoxy phenol, benzaldehyde, a $C_{1-12}$-alkyl phenylacetaldehyde, a $C_{1-12}$-alkyl benzaldehyde, or a combination thereof. In some embodiments, the additional plasticizer comprises a $C_{1-12}$-alkyl benzoate, a $C_{1-12}$-alkyl phenyl ketone, benzyl alcohol, benzaldehyde, a $C_{1-12}$-alkoxy phenol, or a combination thereof.

In some embodiments, the additional plasticizer comprises a $C_{1-12}$-alkyl benzoate, a $C_{1-12}$-n-alkyl benzoate, a $C_{1-6}$-n-alkyl benzoate, or methyl benzoate.

When the additional plasticizer is present, the amount of the present reactive plasticizer can be 10 to 99 weight percent (wt. %), or 50 to 95 wt. %, or 60 to 90 wt. %, based on the total weight of the plasticizer. Correspondingly, the amount of the additional plasticizer can be 1 to 90 wt. %, or 5 to 50 wt. %, or 10 to 40 wt. %, based on the total weight of the plasticizer.

In some embodiments, the composition comprises the hydrogen-bonded prepolymer and the reactive plasticizer in amounts characterized by a ratio of moles of monomer equivalents of prepolymer to moles of reactive plasticizer of 1:1 to 500:1, or 1:1 to 250:1, or 1:1 to 100:1, or 1:1 to 40:1, or 2:1 to 30:1. For example, when the hydrogen-bonded prepolymer is a phenol-formaldehyde prepolymer, the "moles of monomer equivalents of prepolymer" refers to moles of phenol in the phenol-formaldehyde prepolymer.

In some embodiments, the composition comprises the reactive plasticizer in an amount of 0.25 to 50 wt. %, or 1 to 50 wt. %, or 2 to 50 wt. %, or 4 to 35 wt. %, based on the total weight of the reactive plasticizer, the prepolymer, and the optional crosslinking agent. The composition can comprise the prepolymer in an amount of 40 to 90 wt. %, or 45 to 90 wt. %, or 55 to 85 wt. %, based on the total weight of the reactive plasticizer, the prepolymer, and the crosslinking agent. The composition can comprise the crosslinking agent in an amount of 1 to 40 wt. %, or 1 to 30 wt. %, or 1 to 20 wt. %, or 5 to 15 wt. %, based on the total weight of the reactive plasticizer, the prepolymer, and the crosslinking agent.

In addition to the hydrogen-bonded prepolymer and the plasticizer, the composition optionally comprises a crosslinking agent. As used herein, the term "crosslinking agent" refers to an agent capable of chemically crosslinking the hydrogen-bonded prepolymer.

In some embodiments, the crosslinking agent has a solubility of greater than or equal to 25 milligrams per milliliter (mg/mL) of the reactive plasticizer, or greater than or equal to 50 mg/mL of the reactive plasticizer, or greater than or equal to 100 mg/mL of the reactive plasticizer, or greater than or equal to 200 mg/mL of the reactive plasticizer, or greater than or equal to 290 mg/mL of the reactive plasticizer at 25° C.

In some embodiments, the crosslinking agent is hexamethylenetetramine, paraformaldehyde, a polyisocyanate (including diisocyanates), a multifunctional amine (including diamines), an ethylenically unsaturated compound (e.g., a $C_{1-12}$-alkyl (meth)acrylate, styrene, styrene derivative, and the like), or a combination thereof. In some embodiments in which the crosslinking agent is a multifunctional amine, the hydrogen-bonded prepolymer comprises a phenolic hydroxyl containing epoxy prepolymer. In some embodiments, the crosslinking agent comprises hexamethylenetetramine.

In some embodiments, the crosslinking agent excludes organic isocyanates, such as diisocyanates, polyisocyanates, and polymeric isocyanates, and any other isocyanates that can be used in the formation of polyurethanes. In other words, in these embodiments, the crosslinking agent cannot react with the hydrogen-bonded prepolymer to form a polyurethane. In some embodiments in which the hydrogen-bonded prepolymer comprises a phenolic hydroxyl containing epoxy prepolymer, the crosslinking agent comprises a multifunctional amine.

In some embodiments, the composition comprises the hydrogen-bonded prepolymer and the crosslinking agent in amounts characterized by a ratio of moles of monomer equivalents of prepolymer to moles of crosslinking agent of 2:1 to 135:1, or 2:1 to 60:1, or 2:1 to 20:1, or 4:1 to 16:1. For example, when the hydrogen-bonded prepolymer is a phenol-formaldehyde prepolymer and the crosslinking agent is hexamethylenetetramine, the "moles of monomer equivalents of prepolymer" refers to moles of phenol in the phenol-formaldehyde prepolymer, and the "moles of crosslinking agent" refers to moles of hexamethylenetetramine.

The composition can, optionally, further comprise a filler. In some embodiments, the filler is aluminum silicate, calcium silicate, iron silicate, zirconium silicate, fused silica, natural silica sand, boron nitride powder or granules, boron silicate powder or granules, boric oxide, boron trioxide, titanium oxide, titanium diboride, zirconium diboride, aluminum oxide (alumina), aluminum oxynitride, antimony trisulfide, magnesium oxide, zirconium oxide, alumina-zirconia, boron-alumina, calcium sulfate, calcium carbonate, mica, clay, montmorillonite, sodio-montmorillonite saponite, hectorite, beidellite, stevensite, nontronite, vermiculite, halloysite, swelling micas, kaolinite, talc, wollastonite, hollow glass spheres, solid glass spheres, silicate spheres, cenospheres, kaolin, silicon carbide, diamond, boron carbide, boron nitride, aluminum, bronze, iron, nickel, copper, zinc, carbon fibers, glass fibers, quartz fibers, molybdenum sulfide, zinc sulfide, barium titanate, barium ferrite, barium sulfate, glass flakes, silicon carbide flakes, aluminum diboride flakes, poly(ether ketone) fibers, polyimide fibers, polybenzoxazole fibers, poly(phenylene sulfide) fibers, polyester fibers, polyethylene fibers, aromatic polyamide fibers, aromatic polyimide fibers, polyetherimide fibers, polytetrafluoroethylene fibers, acrylic resin fibers, poly(vinyl alcohol) fibers, feldspar, bauxite, chromite, dolomite, mullite, fillite, nepheline syenite, quartz, quartzite, pyrite, cryolite, perlite, tripoli, diatomaceous earth, carbon black, or a combination thereof. In some embodiments, the filler comprises a metal oxide in which the metal is aluminum, chromium, cobalt, copper, iron, magnesium, molybdenum, nickel, palladium, platinum, potassium, sodium, tin, titanium, tungsten, zinc, zirconium, an alloy thereof, or a combination thereof.

The filler can, optionally, be surface treated with an adhesion promoter. Adhesion promoters, by way of example, include chromium complexes, silanes, titanates, zirco-aluminates, propylene maleic anhydride copolymers, reactive cellulose esters, or a combination thereof. When present, the filler can be used in an amount of 10 to 900 parts by weight per 100 parts by weight hydrogen-bonded prepolymer.

The composition can, optionally, further comprise one or more additives known in the thermoset art. Such additives include, for example, emulsifiers, colorants (including pigments and dyes), antimigration agents, coalescing agents, wetting agents, biocides, organosilanes, antifoam agents, antioxidants, light stabilizers, thermal stabilizers, or a combination thereof.

In a specific embodiment of the composition, the hydrogen-bonded prepolymer comprises a phenol-formaldehyde prepolymer having a molar ratio of phenol to formaldehyde greater than 1:1; and the reactive plasticizer comprises a $C_{1-12}$-alkyl anthranilate.

Within this embodiment, the hydrogen-bonded prepolymer and the plasticizer can, optionally, be present in amounts characterized by a ratio of moles of monomer equivalents of prepolymer to moles of plasticizer of 1:1 to 270:1.

Also within this embodiment, the composition can, optionally, comprise the crosslinking agent, wherein the crosslinking agent comprises hexamethylenetetramine. The hydrogen-bonded prepolymer and the crosslinking agent can, optionally, be present in amounts characterized by a ratio of moles of monomer equivalents of prepolymer to moles of crosslinking agent of 2:1 to 135:1.

Another embodiment is a method of forming a crosslinked resin (also referred to herein as a crosslinked composition), comprising: reacting a hydrogen-bonded prepolymer and, optionally, a crosslinking agent, in the presence of the present reactive plasticizer. All of the variations described above in the context of the composition apply as well to the method of forming a crosslinked resin. The reaction of the hydrogen-bonded prepolymer with the crosslinking agent can be conducted at a temperature of 20 to 200° C., or 30 to 180° C. Specific crosslinking conditions are described in the working examples below. Another embodiment is a crosslinked resin obtained by any of the variations of the method.

Another embodiment is a crosslinked resin, comprising: a hexamethylenetetramine-crosslinked phenol-formaldehyde resin, and a crosslinking structure derived from a reactive plasticizer having structure (I), (II), or (III),

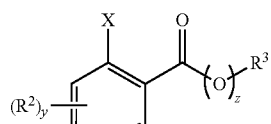

(I)

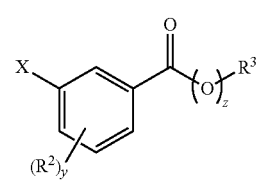

(II)

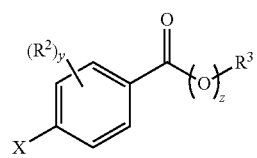

(III)

wherein X is $-OR^1$, $-N(R^1)_2$, $-R^4-OR^1$, or $-R^4-N(R^1)_2$, wherein $R^1$ is independently at each occurrence hydrogen or $C_{1-6}$ alkyl, and $R^4$ is $C_{1-12}$ alkylene; y is zero or 1; z is zero or 1; $R^2$ is $C_1$-12 alkyl; and $R^3$ is $C_{1-12}$ alkyl when z is 1, or $R^3$ is $C_{1-12}$ alkyl or H when z is zero. Preferably $R^3$ is $C_{1-12}$ alkyl.

All of the above-described variations of the present reactive plasticizer apply as well to the crosslinked resin or the cured composition. For example, in some embodiments, the reactive plasticizer comprises a $C_{1-12}$-n-alkyl anthranilate, or a $C_{1-12}$-n-alkyl anthranilate, or methyl anthranilate.

Another embodiment is an article comprising the cured resin or the crosslinked resin as described above. Such articles include, for example, billiard balls, laminates, countertops, bonded abrasives, coated abrasives, bearings, microballoons, brake pads, brake shoes, clutch disks, and loudspeaker driver suspension components.

The invention is further illustrated by the following non-limiting examples.

EXAMPLES

Materials:

Phenol-formaldehyde prepolymer (herein also referred to as the prepolymer), furfural, furfuryl alcohol, and hexamethylenetetramine (HMTA) (>99% crystalline based on differential scanning calorimetry (DSC)) were obtained from Saint-Gobain Corporation. Methyl anthranilate, 99%, was obtained from Alfa Aesar. Based on carbon-13 nuclear magnetic resonance ($^{13}C$ NMR) spectroscopy, the phenolic prepolymer had a random configuration with a ratio of ortho-ortho:ortho-para:para-para linkages of 1:2:1. J. P. Patel, et al., J. Polymer Sci. Part B: Polymer Phys., 2015, vol. 53, pp. 1519-1526. The number average molecular weight of the prepolymer was 1,117 grams per mole (polydispersity index 2.5) in tetrahydrofuran (THF) as determined by gel permeation chromatography (GPC) using polystyrene standards. The prepolymer contained 1.83 (weight/weight) percent water, as determined using proton nuclear magnetic resonance ($^1H$ NMR) spectroscopy.

HMTA was ground in a dry box to reduce the particle size and then mixed with an appropriate amount of the prepolymer. When plasticizer was needed, it was added dropwise into that mixture in a 20 milliliter glass vial. This resulting mixture was then mixed using a mortar and pestle at liquid nitrogen temperature to achieve a uniform dispersion. The mortar with mixture was always kept and ground in a dry box with a relative humidity less than ten percent. The low relative humidity inside the dry box was maintained by flushing with nitrogen gas. The mixture of prepolymer, HMTA, and plasticizer (if any) was ground for 1 to 2 minutes to achieve uniformity. This uniform mixture was then used in DSC, infrared, and low-field nuclear magnetic resonance (LFNMR) analyses.

Instrumentation.

A Q100 TA DSC instrument with a refrigerated cooling system was used for the measurement of both glass transition temperature and the curing energy. Each sample after equilibration was heated at 10° C. per minute from −20 to 110° C. For each mixture, the glass transition temperature ($T_g$) of the second heating was used. The measurement of curing energy was conducted by heating at 5° C. per minute from −20 to 280° C. Each experiment was repeated at least three times and the average value was reported. A similar protocol was used to measure the curing energy. A hermetic aluminum pan from Perkin Elmer was used for the curing energy measurement experiment. One pan held approximately 2 to 4 milligrams (mg) of the mixture of prepolymer, HMTA, and plasticizer. The other pan was empty and used as a reference pan in the DSC experiment.

A Perkin Elmer Spectrum 100 was used for mid-infrared analysis. The samples studied were cured at different temperatures from 30 to 180° C. All infrared data were obtained at room temperature. The Attenuated Total Reflectance (ATR) technique (diamond crystal) proved to be convenient to use for both solid and liquid samples. 256 scans of 1 cm$^{-1}$ resolution were signal averaged. When near infrared data were needed, 32 scans of 1 cm$^{-1}$ resolution were signal averaged.

For composition analysis, a Bruker 400 megahertz (MHz) NMR instrument was used. The solubility of crosslinking agent, HMTA, in plasticizer was measured by using duroquinone as the internal standard. There were two main reasons for choosing duroquinone an internal standard. First, duroquinone is highly soluble in the plasticizer; second, resonances assigned to duroquinone do not overlap those of the plasticizer, HMTA, or the prepolymer.

Approximately 100 to 120 mg of cured sample was used for LFNMR analysis at 50° C. (the standard instrument temperature for LFNMR analysis). The LFNMR tube was obtained from Norell. The sample was equilibrated at 50° C. for at least 30 minutes. The T$_1$ relaxation time was measured using the conventional inverse pulse sequence method (180-τ-90) with 30 data points and 4 scans for each data point. The collected data points were fitted in the one exponential T$_1$ relaxation curve (equation 1) using software provided by Bruker MQ20.

$$M_z = M_o(1 - 2e^{-(\frac{\tau}{T_1})}) \quad (1)$$

where M$_z$ is the nuclear spin magnetization measured as a function of time and the initial value, M$_0$.

Examples 1-10: Effect of the Plasticizer on the Glass Transition Temperature and the Curing Energy The phenol-formaldehyde prepolymer is extremely rigid due to the extensive hydrogen bond network Z. Katovic, M. Stefanic, *Ind. & Eng. Chem. Prod. Res. Dev.*, 1985, vol. 24, pp. 179-185; B. L. Schurmann, L. Vogel, *J. Mat. Sci*, 1996, vol. 31, pp. 3435-3440; T. T. Jones, *J. of App. Chem.*, 1952, vol. 2, pp. 134-149. Although many of the details of the reaction mechanism and the reaction products remain to be characterized, there is no question that segmental mobility is a necessary condition for any reaction to take place. It is possible to disrupt the hydrogen bonds by elevating the sample temperature to facilitate the reaction between the phenolic resin and the crosslinkers T. T. Jones, *J. of App. Chem.*, 1952, vol. 2, pp. 134-149. However, the crosslinking reaction is much more efficient when plasticizers are used. J. P. Patel, et al., J. Polymer Sci. Part B: Polymer Phys., 2015, vol. 53, pp. 1519-1526. Therefore one of the key elements of an effective plasticizer is to disrupt the hydrogen bonded matrix, thereby producing free hydroxyl groups that facilitate dissolution of the crosslinking agent, such as HMTA, without suppressing the reactive sites. J. P. Patel, et al., *J. Polymer Sci. Part B: Polymer Phys.*, 2015, vol. 53, pp. 1519-1526.

The phenolic resin has been characterized previously. J. P. Patel, et al., J. Polymer Sci. Part B: Polymer Phys., 2015, vol. 53, pp. 1519-1526. It has a low molecular weight corresponding to 10 monomer units. Yet it has a well-defined glass transition temperature (T$_g$) at 66-67° C. due to the hydrogen bonds present. In Examples 1-3, varying amounts of a plasticizer of methyl anthranilate, furfural, and furfuryl alcohol, respectively, were added to the prepolymer and the glass transition temperature was determined. The results are shown in FIG. 1.

FIG. 1 illustrates that by adding a small amount of plasticizer, the glass transition temperature of the prepolymer drops significantly, where the circles represent methyl anthranilate, the squares represent furfural, and the triangles represent furfuryl alcohol. This decrease in glass transition temperature illustrates that the plasticizers methyl anthranilate, furfural, and furfuryl alcohol are all effective in disrupting the inter-molecular interactions and increasing the free vol./segmental mobility in the phenol formaldehyde resin. FIG. 1 also shows that the methyl anthranilate has a similar plasticization effect as the furfural.

Figure 2:
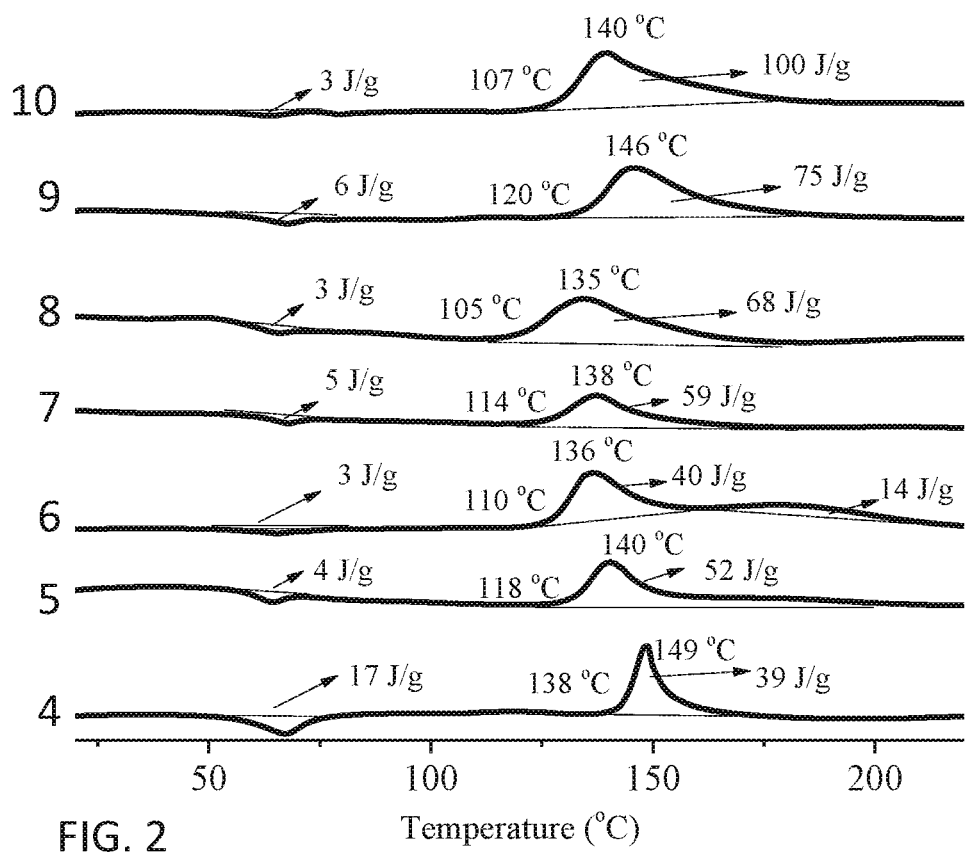
FIG. 2 is a graphical illustration of the curing energies of Examples 4-10.
Figure 3:
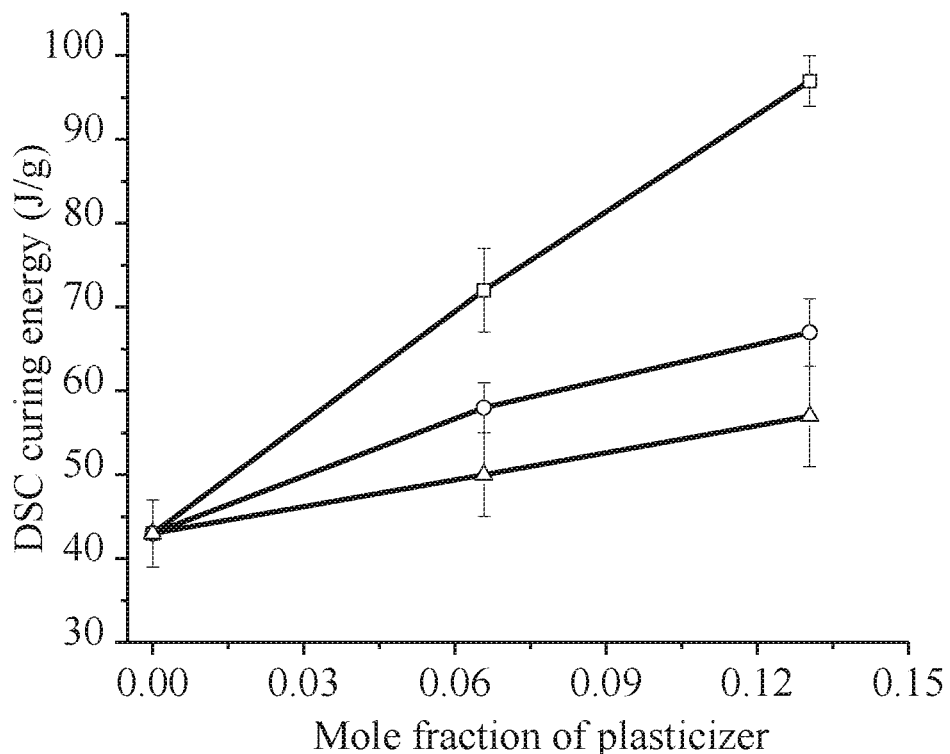
FIG. 3 is a graphical illustration of the curing energies of Examples 4-10 as a function of the mole fraction of plasticizer, where the circles represent methyl anthranilate, the squares represent furfural, and the triangles represent furfuryl alcohol.

The thermograms of the different amounts of and types of plasticizers as described in Table 1 are shown in FIG. 2 and graph of the average curing energy of several samples of the compositions of Examples 4-10 with varying plasticizer and concentration is shown in FIG. 3.

TABLE 1

| Example | Molar ratio Prepolymer:HMTA:Plasticizer | Plasticizer |
|---|---|---|
| 4 | 8:1:0.0 | — |
| 5 | 8:1:0.6 | Furfuryl alcohol |
| 6 | 8:1:1.2 | Furfuryl alcohol |
| 7 | 8:1:0.6 | Methyl anthranilate |
| 8 | 8:1:1.2 | Methyl anthranilate |
| 9 | 8:1:0.6 | Furfural |
| 10 | 8:1:1.2 | Furfural |

In FIG. 2, the endotherms in the 60-75° C. range are attributed to the dissociation of the resin and the exotherms in the 135-150° C. range are attributed to the crosslinking reaction J. P. Patel, et al., *J. Polymer Sci. Part B: Polymer Phys.*, 2015, vol. 53, pp. 1519-1526. FIG. 2 illustrates that, for each sample, the onset of curing is lower for the plasticized samples than the binary mixture of HMTA and phenolic resin. FIG. 2 and FIG. 3 clearly illustrate that the curing energy of the plasticized samples differ significantly based on the type and amount of plasticizer that is added, but that, in all cases, the curing energies for each plasticizer increases with the amount of plasticizer introduced.

As seen in FIG. 2, furfuryl alcohol is the most effective plasticizer in depressing the glass transition temperature as compared to furfural and methyl anthranilate. Merely considering this data, one would have thought that this low glass transition temperature would result in a higher segmental mobility and would ultimately result in a facilitated crosslinking reaction of the prepolymer. FIG. 2 and FIG. 3 show that facilitated crosslinking reaction is not the case. In fact, furfuryl alcohol is the least effective of the three, with the lowest curing energy, on the molar basis.

Example 11: Infrared Spectroscopy and the Effect of Adding the Plasticizer

It is noted that the magnitude of the curing energies of Examples 4-10 is significantly less than the curing energy of 294 J/g when methyl benzoate (see Attorney Docket Number UMA 16-0003), which does not crosslink with the phenolic resin, is the plasticizer. This significant reduction in curing energy clearly suggests a different interaction mechanism occurs between a methyl benzoate plasticizer and the plasticizers of methyl anthranilate, furfural, and furfuryl alcohol. The interaction mechanism was observed using infrared spectroscopy, which provided evidence that the plasticizers of furfural, methyl anthranilate, and furfuryl alcohol were actually chemically reacting with the phenolic resin by forming covalent bonds. Here, infrared spectroscopy data was taken at different reaction temperatures for furfural, furfuryl alcohol, and methyl anthranilate. Because of the complexity of the resin and the plasticizers it is difficult to observe clean distinguishable spectroscopic features for structural analysis. However, there are several localized vibrations that are characteristic of the functional groups present.

Figure 4:
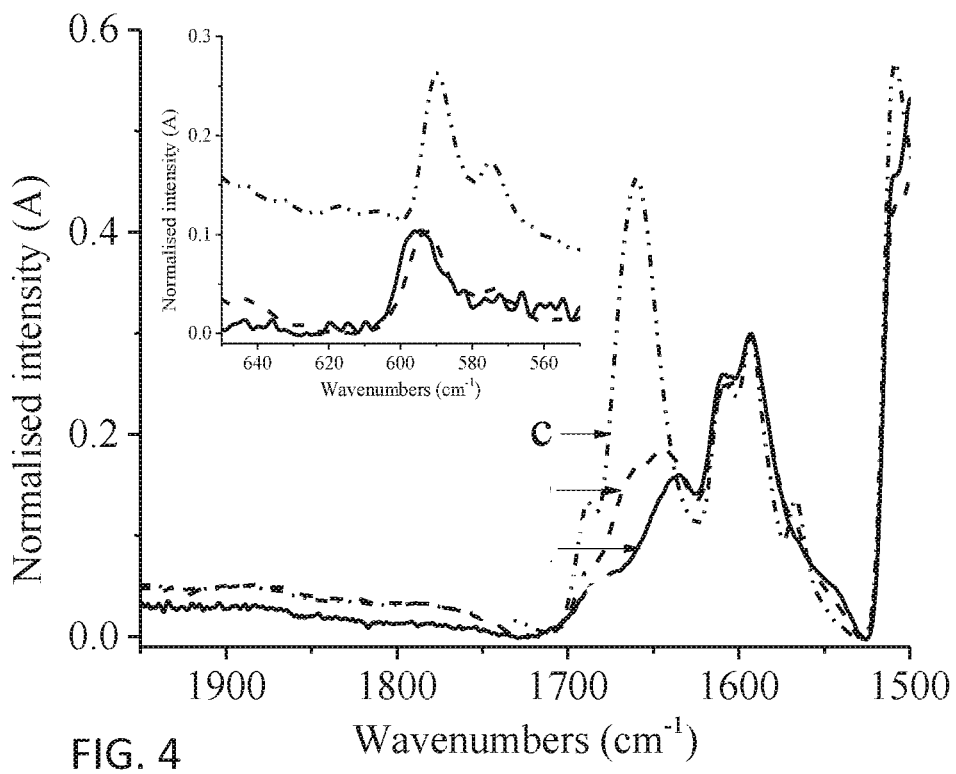
FIG. 4 is a graphical illustration of the infrared spectroscopy data of Example 11 of a ternary mixture comprising the prepolymer, HMTA, and furfural, where the solid line is the data taken at 160° C., the dashed line is the data taken at 140° C., and the dashed and dotted line is the data taken at 20° C.

The infrared spectroscopy data of a ternary mixture comprising the prepolymer, HMTA, and furfural is illustrated in FIG. 4, where the solid line is the data taken at 160° C., the dashed line is the data taken at 140° C., and the dashed and dotted line is the data taken at 20° C. FIG. 4 shows that when furfural is used as the plasticizer, the infrared active carbonyl stretching (1660 cm$^{-1}$) decreases as a function of time and temperature and completely disappears at a temperature approaching 150° C. However, the ring bending vibration assigned previously in the 600 cm$^{-1}$ region remains unperturbed. Internal rotation: VIII. the infrared and Raman spectra of furfural, G. Allen, H. J. Bernstein, *Can. J. of Chem.*, 1955, vol. 33, page 1055 ff. These observations are consistent with the fact that furfural is reacting during the crosslinking reaction but some its structural features (aromatic rings) remain. Moreover, it is noted that the furfural does not react directly with either the prepolymer or HMTA since the furfural features in binary mixtures with just one of HMTA or with the prepolymer remain unperturbed. Furfural therefore only reacts in the ternary mixtures with both HMTA and the prepolymer. In the presence of both HMTA and the prepolymer, the infrared features assignable to furfural rapidly change before reaching to a temperature of 160° C. Hence it is possible to conclude that furfural is changing its structure and is in fact reacting with the phenolic resin, for example, with intermediate products of HMTA and the prepolymer.

Figure 5:
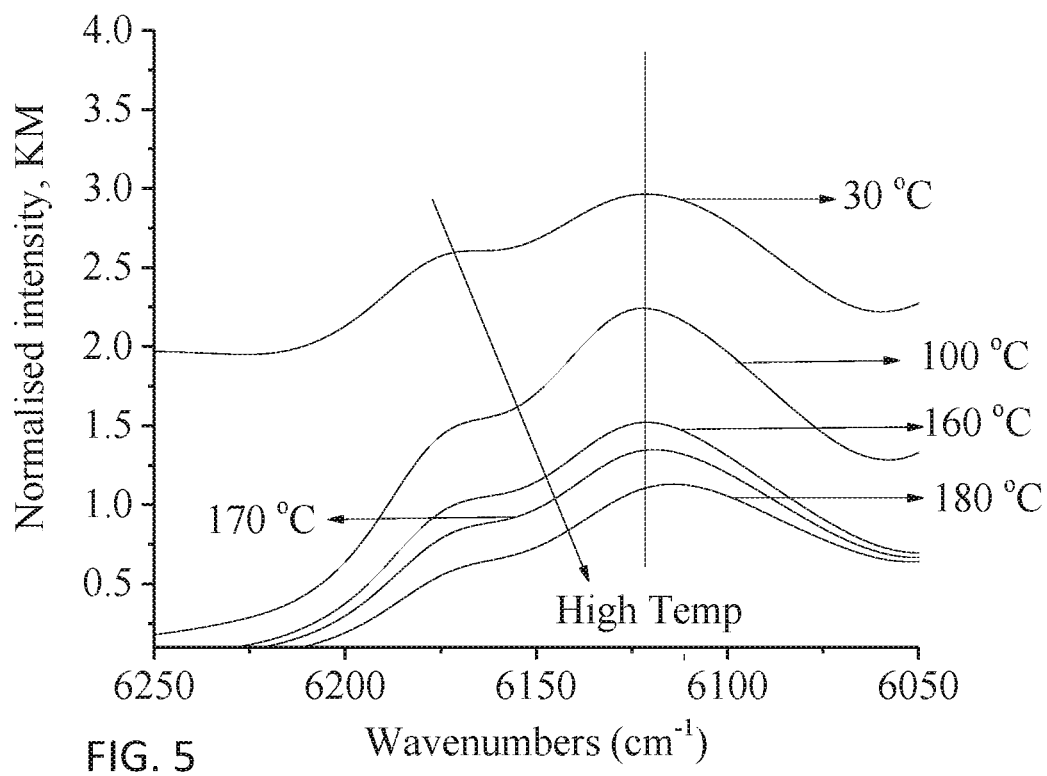
FIG. 5 is a graphical illustration of the infrared spectroscopy data of Example 11 as a function of wavenumber and temperature for a ternary mixture comprising the prepolymer, HMTA, and furfuryl alcohol.

Similarly, the infrared spectroscopy data for the ternary mixture comprising the prepolymer, HMTA, and furfuryl alcohol are illustrated in FIG. 5. Similar to FIG. 4, FIG. 5 illustrates that the furfuryl alcohol reacts in the ternary mixture comprising the HMTA and the prepolymer. For the furfuryl alcohol plasticizer, FIG. 5 shows that at 160° C., the first overtone of the CH aromatic peak starts shifting towards lower frequency side as illustrated by the vertical line. The lower frequency shift of this peak is due to a decrease in the electronegativity of ring substituted functional group in furfuryl alcohol. "Practical guide and spectral atlas for interpretive near-infrared spectroscopy," CRC Press, Workman, J., Weyer, L., 2012. Similar to the furfural, the furfuryl alcohol does not react directly with either the prepolymer or HMTA since the furfuryl features in binary mixtures with just one of HMTA or with the prepolymer remain unperturbed.

Figure 6:
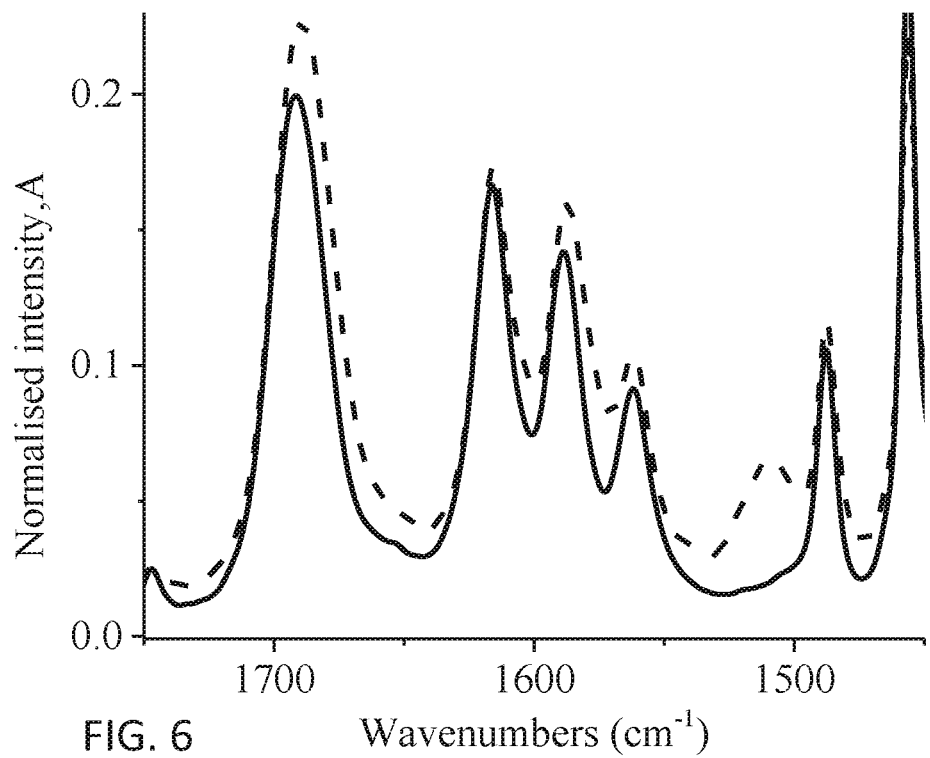
FIG. 6 is a graphical illustration of the infrared spectroscopy data of Example 11 for two binary mixtures each comprising 70 wt. % HMTA and 30 wt. % methyl anthranilate at a temperature of 20° C. (solid line) and at 150° C. (dashed line)
Figure 7:
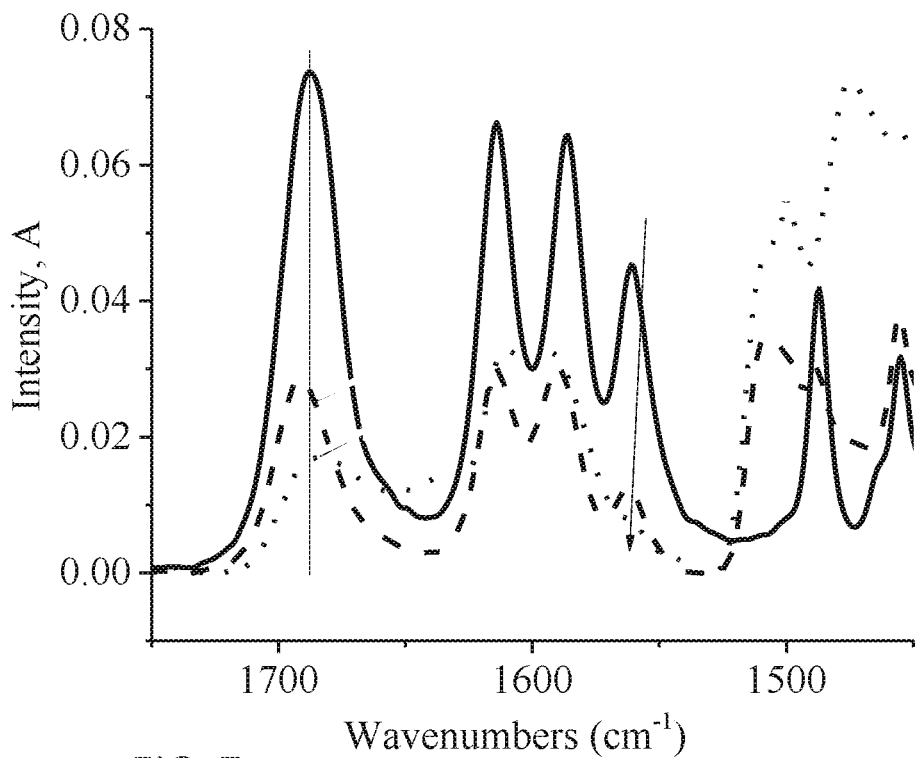
FIG. 7 is a graphical illustration of the infrared spectroscopy data of Example 11 for pure methyl anthranilate (solid line), and for two ternary mixtures each comprising a mole ratio of 8:1:1.2 of the prepolymer:HMTA:methyl anthranilate before curing (dashed line) and at after curing at 180° C. (dotted line)

In contrast to the observation that furfural and furfuryl alcohol only react in the ternary mixture, is was surprisingly discovered that the methyl anthranilate is more reactive than the furfural and furfuryl alcohol as it was found that methyl anthranilate can 1) directly react with HMTA (FIG. 6) and 2) react in the ternary mixture comprising the HMTA and the prepolymer (FIG. 7). FIG. 6 is a graphical illustration of the infrared spectroscopy data for two binary mixtures each comprising 70 wt. % HMTA and 30 wt. % methyl anthranilate at a temperature of 20° C. (solid line) and at 150° C. (dashed line). FIG. 6 shows that a new peak at approximately 1510 cm$^{-1}$, which is assigned to the substitution reaction at ortho and para sites, arises due to the reaction of HMTA and methyl anthranilate. N. B. Colthup, L. H. Daly, S. E. Wiberley, "Introduction to Infrared and Raman Spectroscopy", Academic Press, 1990. It is noted that, due to overlapping of this peak with the highly substituted phenol in the prepolymer, this peak is not easily observed in the ternary mixture of the prepolymer, the HMTA, and the methyl anthranilate.

FIG. 7 is a graphical illustration of the infrared spectroscopy data pure methyl anthranilate (solid line), and for two ternary mixtures each comprising a mole ratio of 8:1:1.2 of the prepolymer:HMTA:methyl anthranilate before curing (dashed line) and at after curing at 180° C. (dotted line). FIG. 7 illustrates the reduction in the ring vibration at 1560 cm$^{-1}$, consistent with the reaction of methyl anthranilate. N. B. Colthup, et al., "Introduction to Infrared and Raman Spectroscopy", Academic Press, 1990.

Example 12: Cross-Linking Efficiency of the Plasticizers

Figure 8:
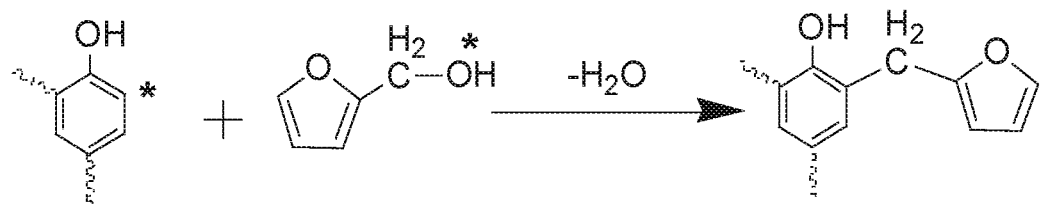
FIG. 8 is an illustration of a reaction of furfuryl alcohol with a phenolic resin.

The DSC data as illustrated in FIG. 2 show that there are two exothermic peaks and that as the concentration of the furfuryl alcohol is increased, the area of the higher temperature exotherm increases. Without being bound by theory, it is believed that the first peak at the lower temperature is assignable to the reaction of the prepolymer and the HMTA and the second peak is associated with the reaction of furfuryl alcohol and the phenolic resin. Such a reaction of furfuryl alcohol and the phenolic resin is illustrated in FIG. 8. FIG. 8 illustrates that when furfuryl alcohol reacts with the phenolic resin, chain terminating structures result, suggesting that the furfuryl alcohol does not contribute to the crosslinking of the resin.

Figure 9:
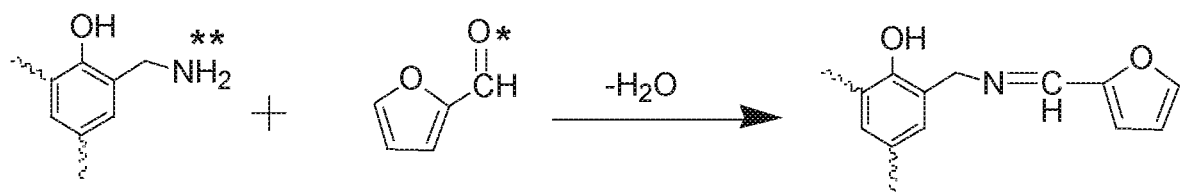
FIG. 9 is an illustration of a reaction of furfural with a primary amine from an HMTA reaction located on the phenolic resin.

The most studied of the three plasticizers is furfural, where it has been found that the crosslinking reaction of HMTA and the prepolymer produces 16 different types of linkages of benzoxazine, benzylamine, diamine, dibenzylamine, imine, imide, amide, methylene and others. G. R. Hatfield, G. E. Maciel, *Macromolecules*, 1987, vol. 20, pp. 608-615; T. R. Dargaville, et al., *J. of Polymer Sci. Part A: Polymer Chem.*, 1997, vol. 35, pp. 1389-1398; X. Zhang, et al., *Polymer*, 1997, vol. 38, pp. 5835-5848. "The chemistry of novolac resins" V. Reactions of benzoxazine intermediates, Zhang, Xiaoqing, et al., *Polymer*, 1998, vol. 39, p. 399. Furfural can react with either primary or secondary amines formed as the primary products between HMTA and the phenolic resin. A Summary of the Reactions of Aldehydes with Amines, Sprung, Murray A., Chemical Reviews, 1940, 26, 297-338. Chemistry and application of phenolic resins, Knop, A. Scheib W., Publisher Springer-Verlag, 1979. The reaction between furfural and the two types of primary amine produces Schiff base or imine bonds as illustrated in FIG. 9.

Figure 10:
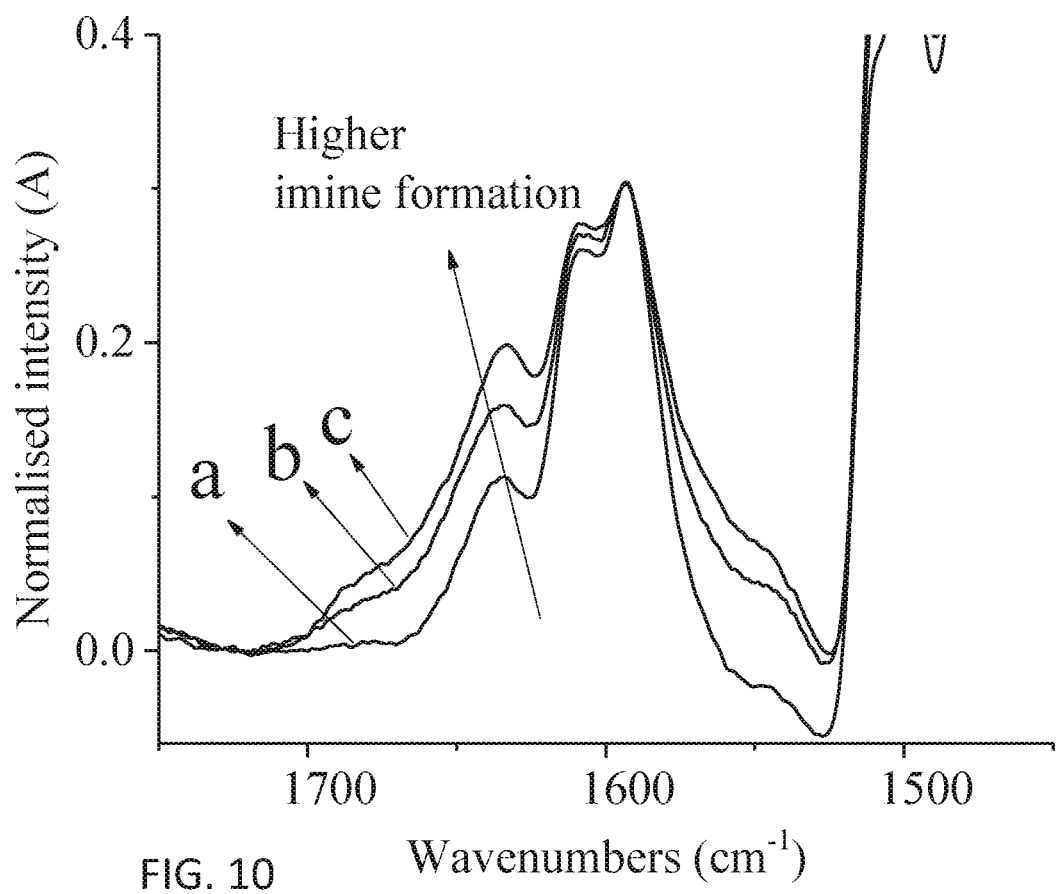
FIG. 10 is a graphical illustration of the infrared spectroscopy data of Example 12 of a binary blend of prepolymer to HMTA having a mole ratio of 8:1 (line a), and for two ternary mixtures each comprising the prepolymer, HMTA, and furfural having mole ratios of 8:1:0.6 (line b) and 8:1:1.2 (line c)

While it was found that furfural can result in crosslinking structures through reaction with secondary amines, the reaction of furfural can also result in an increased amount of chain terminating structures. For example, FIG. 10 illustrates the infrared spectroscopy data of a binary blend of prepolymer to HMTA having a mole ratio of 8:1 (line a), and for two ternary mixtures each comprising the prepolymer, HMTA, and furfural having mole ratios of 8:1:0.6 (line b) and 8:1:1.2 (line c). FIG. 10 illustrates that an increasing concentration of furfural results in an increasing amount of imine formation (see the arrow). Based on the infrared spectroscopy data of FIG. 10 and the reaction scheme of FIG. 9, it can be concluded that increasing the concentration of furfural results in the increased formation of chain terminating structures in addition to the crosslinking structures.

Figure 11:
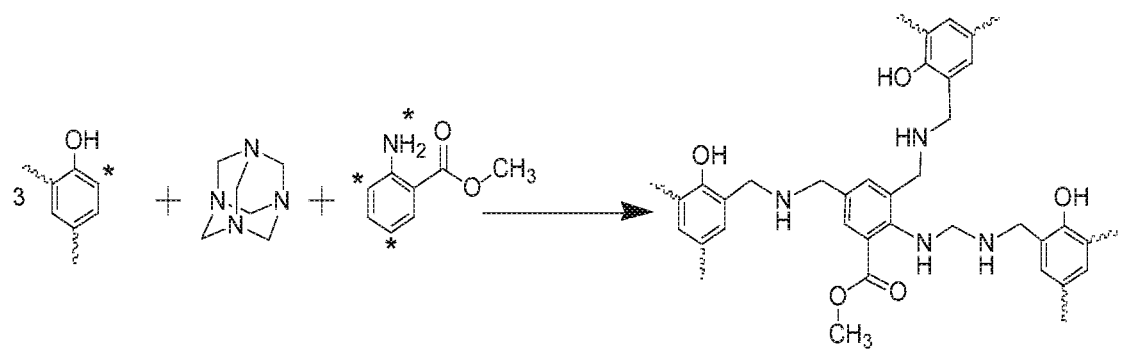
FIG. 11 is a graphical illustration of a reaction of methyl anthranilate, HMTA, and a phenolic resin.

Analysis of infrared spectroscopy data shows that the methyl anthranilate forms crosslinking structures in the polymerizing phenolic resin. An example of a crosslinking structure is illustrated in FIG. 11. FIG. 11 shows that, due to the electron rich ring in methyl anthranilate, ortho and para reaction sites as shown as stars can easily react with HMTA molecule. This figure is consistent with the emergence of a new peak at approximately 1500 cm$^{-1}$, which is assignable to highly substituted rings. This observation demonstrates that methyl anthranilate has the ability to dissolve HMTA crystals and that it reacts with the HMTA. Without being bound by theory, it is believed that the methyl anthranilate interact via the hydroxyl units similar to the interaction between HMTA and plasticized phenolic resin. It is noted that when all three components are mixed, the prepolymer vibration at 1500 cm$^{-1}$ overlaps with the HMTA and the reacting methyl anthranilate. Therefore, this peak cannot be cleanly analyzed. However, the other ring vibration of methyl anthranilate, clearly decreases in intensity with the curing temperature, consistent with the fact that methyl anthranilate is reacting with HMTA and phenolic resin.

This analysis clearly illustrates that methyl anthranilate has the highest reactive functionality followed by furfural and then by furfuryl alcohol, where furfural can form both crosslinked structures and chain termination structures and furfuryl alcohol only forms chain termination structures. Therefore, it is concluded that a phenolic resin formed from methyl anthranilate as compared to a corresponding resin formed from either furfural or furfuryl alcohol will result in a higher amount of crosslinking.

Due to complexity of curing reaction and the formation of chain termination structures in phenol formaldehyde resin, it is difficult to measure the amount of crosslinks formed. G. R. Hatfield, G. E. Maciel, *Macromolecules*, 1987, vol. 20, pp. 608-615; T. R. Dargaville, et al., *J. of Polymer Sci. Part A: Polymer Chem.*, 1997, vol. 35, pp. 1389-1398; X. Zhang, et al., *Polymer*, 1997, vol. 38, pp. 5835-5848. The chemistry of novolac resins" V. Reactions of benzoxazine intermediates, Zhang, Xiaoqing, et al., *Polymer*, 1998, 39, 399. The chemistry of novolac resins—VI. Reactions between benzoxazine intermediates and model phenols, Zhang, Xiaoqing, Solomon, David H., Polymer, 39, 405. As is shown above, measurements of curing energy do not always relate to the amount of crosslinking achieved. Some insight into the resultant amount of crosslinking can be obtained by measuring the $T_1$ relaxation time using low field NMR (LFNMR) as the $T_1$ relaxation time is related to the segmental dynamics of the crosslinked chains. The LFNMR experiments were performed at a temperature of 50° C. This temperature is significantly below the glass transition temperature of the crosslinked phenolic resin. Accordingly, it can be concluded that the $T_1$ relaxation time originate from the short range cooperative motion and not from the long range cooperative motion. As the crosslinking reaction proceeds, this short range motion will be increasingly restricted, raising the value of the $T_1$ relaxation time.

Figure 12:
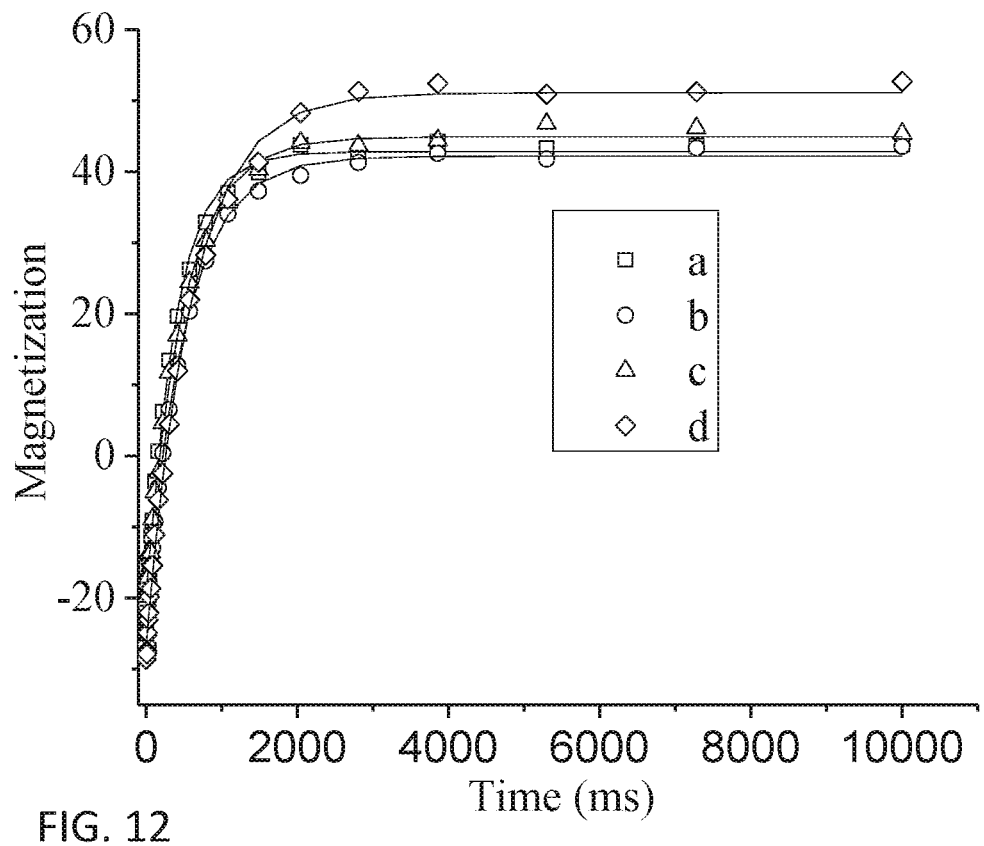
FIG. 12 is a graphical illustration of the magnetization with time of Example 12, where of crosslinked resins derived from a composition having a prepolymer to HMTA mole ratio of 8:1 (square); a composition having a prepolymer, HMTA, and furfural having mole ratio of 8:1:0.6 (circle); a composition having a prepolymer, HMTA, and furfuryl alcohol having mole ratio of 8:1:0.6 (triangle); a composition having a prepolymer, HMTA, and furfural having mole ratio of 8:1:0.4 (diamond)
Figure 13:
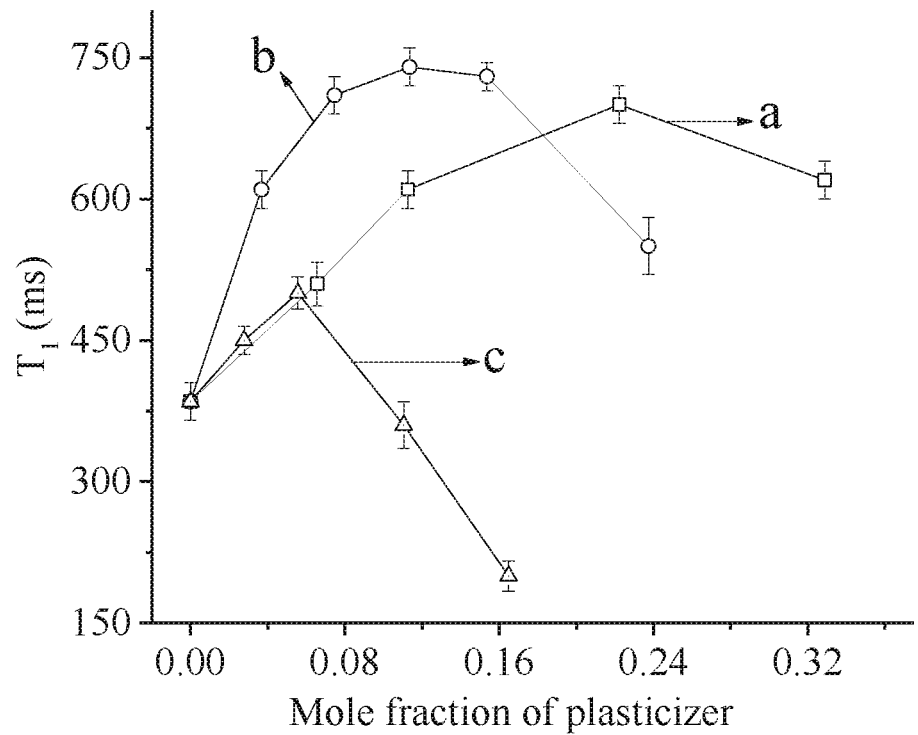
FIG. 13 is a graphical illustration of the $T_1$ relaxation times as a function of the plasticizer concentration of Example 12, where the circles represent methyl anthranilate, the squares represent furfural, and the triangles represent furfuryl alcohol.

An example of the magnetization taken from crosslinked resins is illustrated in FIG. 12. It can be seen from FIG. 12 that the magnetization increases rapidly as a function of time. The $T_1$ relaxation times were then determined for the crosslinked phenolic resin formed in the presence of the different plasticizers as a function of concentration and are shown in FIG. 13, where the circles represent methyl anthranilate, the squares represent furfural, and the triangles represent furfuryl alcohol. FIG. 13 illustrates that, at lower concentrations, the value of the $T_1$ relaxation time is greater than the value of the $T_1$ relaxation time of furfural. FIG. 13 further illustrates that a lesser concentration of methyl anthranilate is capable of achieving a maximum amount of crosslinking compared to furfural, which can only be possible if the crosslinking functionality of methyl anthranilate is higher than furfural. Regarding the furfuryl alcohol, FIG. 13 illustrates that the decrease in the amount of crosslinking occurs at a mole fraction of furfuryl alcohol of less than 0.08, confirming that the reaction of furfuryl alcohol is not effective in the generation of the crosslinking, but instead results in an increase in the number of dangling ends. It is therefore clear from FIG. 13 that methyl anthranilate is more effective at crosslinking the phenolic resin than both furfural and furfuryl alcohol. This data is consistent with the functionality of each plasticizer as discussed above and suggests that methyl anthranilate will have higher crosslinking functionalities than furfural.

Without being bound by theory, it is believed that this higher crosslinking of the reactive plasticizer will result in a crosslinked resin having an increased modulus as compared to a corresponding resin but derived from a crosslinker with a lesser crosslinking functionality or that does not result in crosslinking structures.

The invention includes at least the following embodiments.

Embodiment 1

A curable composition, comprising: a hydrogen-bonded prepolymer; a plasticizer; and optionally, a crosslinking agent; wherein the plasticizer comprises a reactive plasticizer having structure (I), (II), or (III) above, wherein X is —OR$^1$, —N(R$^1$)$_2$, —R$^4$—OR$^1$, or —R$^4$—N(R$^1$)$_2$, wherein R$^1$ is independently at each occurrence hydrogen or C$_{1-6}$ alkyl, and R$^4$ is C$_{1-12}$ alkylene; y is zero or 1; z is zero or 1; R$^2$ is C$_{1-12}$ alkyl; and R$^3$ is C$_{1-12}$ alkyl when z is 1, or R$^3$ is C$_{1-12}$ alkyl or H when z is zero, preferably wherein R$^3$ is C$_{1-12}$ alkyl.

Embodiment 2

The curable composition of embodiment 1, wherein the hydrogen-bonded prepolymer is a phenol-formaldehyde prepolymers aniline-formaldehyde prepolymer, urea-formaldehyde prepolymer, phenolic hydroxyl containing epoxy prepolymer, cresol-aldehyde prepolymer, resorcinol-aldehyde prepolymer, urea-aldehyde prepolymer, melamine-formaldehyde prepolymer, polyester, polyimide, polyurethanes (including a polyester or polyether-based polyurethane), epoxy resin, or a combination thereof.

Embodiment 3

The curable composition of embodiment 2, wherein the hydrogen-bonded prepolymer comprises a phenol-formaldehyde prepolymer.

Embodiment 4

The curable composition of embodiment 3, wherein the phenol-formaldehyde prepolymer has a molar ratio of phenol to formaldehyde greater than 1:1.

Embodiment 5

The curable composition of any one of embodiments 1-4, wherein the reactive plasticizer has structure (I).

Embodiment 6

The curable composition of any one of embodiments 1-5, wherein each occurrence of X is —$N(R^1)_2$.

Embodiment 7

The curable composition of embodiment 6, wherein each occurrence of $R^1$ is hydrogen.

Embodiment 8

The curable composition of any one of embodiments 1-7, wherein y is zero.

Embodiment 9

The curable composition of any one of embodiments 1-7, wherein y is 1.

Embodiment 10

The curable composition of any one of embodiments 1-7, wherein z is zero.

Embodiment 11

The curable composition of any one of embodiments 1-7, wherein z is 1.

Embodiment 12

The curable composition of any one of embodiments 1-4, wherein the reactive plasticizer is methyl anthranilate, ethyl anthranilate, 1-propyl anthranilate (propyl anthranilate, propyl 2-aminobenzoate), 2-propyl anthranilate (isopropyl anthranilate, isopropyl 2-aminobenzoate, propan-2-yl 2-aminobenzoate)), 1-butyl anthranilate (butyl anthranilate, butyl 2-aminobenzoate), 2-butyl anthranilate (isobutyl anthranilate, isobutyl 2-aminobenzoate, 2-methylpropyl 2-aminobenzoate), 1-pentyl anthranilate (pentyl 2-aminobenzoate), 2-pentyl anthranilate (2-pentyl 2-aminobenzoate), 3-pentyl anthranilate (3-pentyl 2-aminobenzoate), 3-methyl-1-butyl anthranilate (3-methylbutyl 2-aminobenzoate), 1-hexyl anthranilate (hexyl 2-aminobenzoate), 1-heptyl anthranilate (heptyl 2-aminobenzoate), 1-octyl anthranilate (octyl 2-aminobenzoate), 2-ethyl-1-hexyl anthranilate (2-ethylhexyl 2-aminobenzoate), 1-nonyl anthranilate (nonyl 2-aminobenzoate), 7-methyl-1-octyl anthranilate (7-methyloctyl 2-aminobenzoate), 1-decyl anthranilate (decyl 2-aminobenzoate), cyclohexyl anthranilate (cyclohexyl 2-aminobenzoate), menthyl anthranilate (menthyl 2-aminobenzoate), methyl 2-amino-3-methylbenzoate, methyl 2-amino-3-ethylbenzoate, methyl 2-amino-3-propylbenzoate, methyl 2-amino-3-isopropylbenzoate, methyl 2-amino-3-butylbenzoate, ethyl 2-amino-3-methylbenzoate, ethyl 2-amino-3-ethylbenzoate, ethyl 2-amino-3-propylbenzoate, propyl 2-amino-3-methylbenzoate, propyl 2-amino-3-ethylbenzoate, propyl 2-amino-3-propylbenzoate, butyl 2-amino-3-methylbenzoate, pentyl 2-amino-3-methylbenzoate, hexyl 2-amino-3-methylbenzoate, heptyl 2-amino-3-methylbenzoate, 2-ethylhexyl 2-amino-3-methylbenzoate, octyl 2-amino-3-methylbenzoate, nonyl 2-amino-3-methylbenzoate, decyl 2-amino-3-methylbenzoate, methyl 3-aminobenzoate, ethyl 3-aminobenzoate, propyl 3-aminobenzoate, butyl 3-aminobenzoate, 3-methylbutyl 3-aminobenzoate, pentyl 3-aminobenzoate, hexyl 3-aminobenzoate, heptyl 3-aminobenzoate, 2-ethylhexyl 3-aminobenzoate, octyl 3-aminobenzoate, nonyl 3-aminobenzoate, decyl 3-aminobenzoate, dodecyl 3-aminobenzoate, methyl 2-amino-4-methylbenzoate, methyl 2-amino-4-ethylbenzoate, methyl 2-amino-4-propylbenzoate, methyl 3-amino-4-propylbenzoate, ethyl 2-amino-4-methylbenzoate, ethyl 2-amino-4-ethylbenzoate, methyl 2-amino-5-methylbenzoate, methyl 2-amino-5-ethylbenzoate, methyl 2-amino-5-propylbenzoate, methyl 2-amino-5-butylbenzoate, methyl 3-amino-5-propylbenzoate, ethyl 3-amino-4-pentylbenzoate, ethyl 2-amino-5-methylbenzoate, ethyl 2-amino-5-ethylbenzoate, ethyl 2-amino-5-propylbenzoate, ethyl 2-amino-5-butylbenzoate, methyl 2-amino-6-methylbenzoate, methyl 2-amino-6-propylbenzoate, ethyl 2-amino-6-methylbenzoate, ethyl 2-amino-6-ethylbenzoate, methyl 4-aminobenzoate, methyl 4-amino-3-methylbenzoate, methyl 4-amino-3-ethylbenzoate, methyl 4-amino-3-ethylbenzoate, methyl 4-amino-2-propylbenzoate, ethyl 4-aminobenzoate, ethyl 4-amino-2-propyl benzoate, ethyl 4-amino-3-propyl benzoate, propyl 4-aminobenzoate, butyl 4-aminobenzoate, pentyl 4-aminobenzoate, 3-methylbutyl 4-aminobenzoate, hexyl 4-aminobenzoate, 2-ethylhexyl 4-aminobenzoate, octyl 4-aminobenzoate, nonyl 4-aminobenzoate, decyl 4-aminobenzoate, dodecyl 4-aminobenzoate, methyl 2-(1-aminoethyl)benzoate, methyl 2-(1-aminopropyl)benzoate, methyl 2-(2-aminopropyl)benzoate, methyl 2-(1-aminobutyl)benzoate, methyl 2-(2-aminobutyl)benzoate, ethyl 4-(4-aminohexyl)benzoate, methyl 4-(1-aminoethyl)benzoate, methyl 4-(1-aminopropyl)benzoate, methyl 4-(1-aminobutyl)benzoate, methyl 4-(1-aminohexyl)benzoate, methyl 4-(2-aminoethyl)benzoate, methyl 4-(2-aminopropyl)benzoate, methyl 4-(2-aminobutyl)benzoate, methyl 4-(3-aminopropyl)benzoate, methyl 4-(3-aminobutyl)benzoate, methyl 4-(4-aminobutyl)benzoate, methyl 3-(2-aminoethyl)benzoate, methyl 3-(2-aminopropyl)benzoate, methyl 3-(2-aminobutyl)benzoate, methyl 3-(3-aminopropyl)benzoate, methyl 2-(1-aminoethyl)benzoate, methyl 2-(1-aminopropyl)benzoate, methyl 2-(1-aminobutyl)benzoate, methyl 3-(1-aminoethyl)benzoate, methyl 3-(1-aminopropyl)benzoate, methyl 3-(1-aminobutyl)benzoate, methyl 2-(2-aminoethyl)benzoate, methyl 2-(2-aminopropyl)benzoate, methyl 2-(2-aminobutyl)benzoate, methyl 2-(3-aminopropyl)benzoate, methyl 2-(4-aminobutyl)benzoate, ethyl 2-(3-aminopropyl)benzoate, ethyl 3-(3-aminopropyl)benzoate, ethyl 4-(3-aminopropyl)benzoate, ethyl 4-(4-aminobutyl)benzoate, ethyl-4-(4-aminohexyl)benzoate, ethyl 4-(2-aminopropyl)benzoate, ethyl 4-(1-aminobutyl)benzoate, or a combination thereof.

Embodiment 13

The curable composition of any one of embodiments 1-4, wherein the reactive plasticizer comprises a $C_{1-12}$-alkyl anthranilate.

Embodiment 14

The curable composition of any one of embodiments 1-4, wherein the reactive plasticizer comprises a $C_{1-12}$-n-alkyl anthranilate.

Embodiment 15

The curable composition of any one of embodiments 1-4, wherein the reactive plasticizer comprises methyl anthranilate.

Embodiment 16

The curable composition of any one of embodiments 1-4, wherein the reactive plasticizer comprises a $C_{1-12}$-alkyl 2-aminophenyl ketone.

Embodiment 17

The curable composition of any one of embodiments 1-4, wherein the reactive plasticizer comprises an n-$C_{1-12}$-alkyl 2-aminophenyl ketone.

Embodiment 18

The curable composition of any one of embodiments 1-4, wherein the reactive plasticizer comprises methyl 2-aminophenyl ketone.

Embodiment 19

The curable composition of any one of embodiments 1-18, further comprising an additional plasticizer; wherein the additional plasticizer comprises glycerol, a $C_{1-12}$-alkyl benzoate, a $C_{1-12}$-alkyl phenyl ketone, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, a $C_{1-12}$-alkoxy phenol, benzyl alcohol, benzaldehyde, a $C_{1-12}$-alkyl phenylacetaldehyde, $C_{1-12}$-alkyl benzaldehyde, or a combination thereof.

Embodiment 20

The curable composition of any one of embodiments 1-18, further comprising a $C_{1-12}$-alkyl benzoate, a $C_{1-12}$-alkyl phenyl ketone, benzyl alcohol, benzaldehyde, a $C_{1-12}$-alkoxy phenol, or a combination thereof.

Embodiment 21

The curable composition of any one of embodiments 1-20, comprising the hydrogen-bonded prepolymer and the plasticizer in amounts characterized by a ratio of moles of monomer equivalents of prepolymer to moles of plasticizer of 1:1 to 500:1.

Embodiment 22

The curable composition of any one of embodiments 1-21, wherein the crosslinking agent is present and has a solubility greater than or equal to 50 mg/mL in the plasticizer at 25° C.

Embodiment 23

The curable composition of any one of embodiments 1-21, wherein the crosslinking agent is present and is hexamethylenetetramine, paraformaldehyde, a polyisocyanate, a multifunctional amine, an ethylenically unsaturated compounds (e.g., a $C_{1-12}$-alkyl (meth)acrylate, styrene, styrene derivative, and the like) or a combination thereof.

Embodiment 24

The curable composition of any one of embodiments 1-21, wherein the crosslinking agent is present and comprises hexamethylenetetramine.

Embodiment 25

The curable composition of any one of embodiments 1-24, comprising the hydrogen-bonded prepolymer and the crosslinking agent in amounts characterized by a ratio of moles of monomer equivalents of prepolymer to moles of crosslinking agent of 2:1 to 135:1.

Embodiment 26

The curable composition of any one of embodiments 1-25, further comprising a filler.

Embodiment 27

The curable composition of embodiment 26, wherein the filler is aluminum silicate, calcium silicate, iron silicate, zirconium silicate, fused silica, natural silica sand, boron nitride powder or granules, boron silicate powder or granules, boric oxide, boron trioxide, titanium oxide, titanium diboride, zirconium diboride, aluminum oxide (alumina), aluminum oxynitride, antimony trisulfide, magnesium oxide, zirconium oxide, other metal oxides in which the metal is chromium, cobalt, copper, iron, molybdenum, nickel, palladium, platinum, potassium, sodium, tin, titanium, tungsten, zinc, and alloys or a combination thereof, alumina-zirconia, boron-alumina, calcium sulfate, calcium carbonate, mica, clay, montmorillonite, sodio-montmorillonite saponite, hectorite, beidellite, stevensite, nontronite, vermiculite, halloysite, swelling micas, kaolinite, talc, wollastonite, hollow glass spheres, solid glass spheres, silicate spheres, cenospheres, kaolin, silicon carbide, diamond, boron carbide, boron nitride, aluminum, bronze, iron, nickel, copper, zinc, carbon fibers, glass fibers, quartz fibers, molybdenum sulfide, zinc sulfide, barium titanate, barium ferrite, barium sulfate, glass flakes, silicon carbide flakes, aluminum diboride flakes, poly(ether ketone) fibers, polyimide fibers, polybenzoxazole fibers, poly(phenylene sulfide) fibers, polyester fibers, polyethylene fibers, aromatic polyamide fibers, aromatic polyimide fibers, polyetherimide fibers, polytetrafluoroethylene fibers, acrylic resin fibers, poly(vinyl alcohol) fibers, feldspar, bauxite, chromite, dolomite, mullite, fillite, nepheline syenite, quartz, quartzite, pyrite, cryolite, perlite, tripoli, diatomaceous earth, carbon black, or a combination thereof.

Embodiment 28

The curable composition of embodiment 26 or 27, comprising 10 to 900 parts by weight filler per 100 parts by weight of the hydrogen-bonded prepolymer.

Embodiment 29

The curable composition of embodiment 1, wherein the hydrogen-bonded prepolymer comprises a phenol-formaldehyde prepolymer having a molar ratio of phenol to formaldehyde greater than 1:1; and wherein the reactive plasticizer comprises methyl anthranilate.

Embodiment 30

The curable composition of embodiment 29, comprising the hydrogen-bonded prepolymer and the plasticizer in amounts characterized by a ratio of moles of monomer equivalents of prepolymer to moles of plasticizer of 1:1 to 500:1.

Embodiment 31

The curable composition of embodiment 29 or 30, wherein the composition comprises the crosslinking agent, and wherein the crosslinking agent comprises hexamethylenetetramine.

Embodiment 32

The curable composition of embodiment 31, comprising the hydrogen-bonded prepolymer and the crosslinking agent in amounts characterized by a ratio of moles of monomer equivalents of prepolymer to moles of crosslinking agent of 2:1 to 135:1.

Embodiment 33

A method of forming a cured resin, the method comprising curing the curable composition of any one of embodiments 1-32.

Embodiment 34

A method of forming a cured resin, the method comprising: reacting a hydrogen-bonded prepolymer and, optionally, a crosslinking agent, in the presence of a plasticizer; wherein the plasticizer comprises a reactive plasticizer having structure (I), (II), or (III) above, wherein X is —$OR^1$, —$N(R^1)_2$, —$R^4$—$OR^1$, or —$R^4$—$N(R^1)_2$, wherein $R^1$ is independently at each occurrence hydrogen or $C_{1-6}$ alkyl, and $R^4$ is $C_{1-12}$ alkylene; y is zero or 1; z is zero or 1; $R^2$ is $C_{1-12}$ alkyl; and $R^3$ is $C_{1-12}$ alkyl when z is 1, or $R^3$ is $C_{1-12}$ alkyl or H when z is zero, preferably wherein $R^3$ is $C_{1-12}$ alkyl.

Embodiment 35

The method of embodiment 34, wherein the hydrogen-bonded prepolymer is phenol-formaldehyde prepolymers, phenol-furfural prepolymers, aniline-formaldehyde prepolymers, urea-formaldehyde prepolymers, cresol-formaldehyde prepolymers, resorcinol-formaldehyde prepolymers, melamine-formaldehyde prepolymers, polyesters, polyimides, polyurethanes (including polyester or polyether-based polyurethanes), epoxy resins, or a combination thereof.

Embodiment 36

The method of embodiment 34, wherein the hydrogen-bonded prepolymer comprises a phenol-formaldehyde prepolymer.

Embodiment 37

The method of embodiment 36, wherein the phenol-formaldehyde prepolymer has a molar ratio of phenol to formaldehyde greater than 1.

Embodiment 38

The method of any one of embodiments 34-37, wherein the reactive plasticizer has structure (I).

Embodiment 39

The method of any one of embodiments 34-38, wherein each occurrence of X is —$N(R^1)_2$.

Embodiment 40

The method of embodiment 39, wherein each occurrence of $R^1$ is hydrogen.

Embodiment 41

The method of any one of embodiments 34-40, wherein y is zero.

Embodiment 42

The method of any one of embodiments 34-40, wherein y is 1.

Embodiment 43

The method of any one of embodiments 34-42, wherein z is zero.

Embodiment 44

The method of any one of embodiments 34-42, wherein z is 1.

Embodiment 45

The method of any one of embodiments 34-37, wherein the reactive plasticizer is methyl anthranilate, ethyl anthranilate, 1-propyl anthranilate (propyl anthranilate, propyl 2-aminobenzoate), 2-propyl anthranilate (isopropyl anthranilate, isopropyl 2-aminobenzoate, propan-2-yl 2-aminobenzoate)), 1-butyl anthranilate (butyl anthranilate, butyl 2-aminobenzoate), 2-butyl anthranilate (isobutyl anthranilate, isobutyl 2-aminobenzoate, 2-methylpropyl 2-aminobenzoate), 1-pentyl anthranilate (pentyl 2-aminobenzoate), 2-pentyl anthranilate (2-pentyl 2-aminobenzoate), 3-pentyl anthranilate (3-pentyl 2-aminobenzoate), 3-methyl-1-butyl anthranilate (3-methylbutyl 2-aminobenzoate), 1-hexyl anthranilate (hexyl 2-aminobenzoate), 1-heptyl anthranilate (heptyl 2-aminobenzoate), 1-octyl anthranilate (octyl 2-aminobenzoate), 2-ethyl-1-hexyl anthranilate (2-ethylhexyl 2-aminobenzoate), 1-nonyl anthranilate (nonyl 2-aminobenzoate), 7-methyl-1-octyl anthranilate (7-methyloctyl 2-aminobenzoate), 1-decyl anthranilate (decyl 2-aminobenzoate), cyclohexyl anthranilate (cyclohexyl 2-aminobenzoate), menthyl anthranilate (menthyl 2-aminobenzoate), methyl 2-amino-3-methylbenzoate, methyl 2-amino-3-ethylbenzoate, methyl 2-amino-3-propylbenzoate, methyl 2-amino-3-isopropylbenzoate, methyl 2-amino-3-butylbenzoate, ethyl 2-amino-3-methylbenzoate, ethyl 2-amino-3-ethylbenzoate, ethyl 2-amino-3-propylbenzoate, propyl 2-amino-3-methylbenzoate, propyl 2-amino-3-ethylbenzoate, propyl 2-amino-3-propylbenzoate, butyl 2-amino-3-methylbenzoate, pentyl 2-amino-3-methylbenzoate, hexyl 2-amino-3-methylbenzoate, heptyl 2-amino-3-methylbenzoate, 2-ethylhexyl 2-amino-3-methylbenzoate, octyl 2-amino-3-methylbenzoate, nonyl 2-amino-3-methylbenzoate, decyl 2-amino-3-methylbenzoate, methyl 3-aminobenzoate, ethyl 3-aminobenzoate, propyl 3-aminobenzoate, butyl 3-aminobenzoate, 3-methylbutyl 3-aminobenzoate, pentyl 3-aminobenzoate, hexyl 3-aminobenzoate, heptyl 3-aminobenzoate, 2-ethylhexyl 3-aminobenzoate, octyl 3-aminobenzoate, nonyl 3-aminobenzoate, decyl 3-aminobenzoate, dodecyl 3-aminobenzoate, methyl 2-amino-4-methylbenzoate, methyl 2-amino-4-ethylbenzoate, methyl 2-amino-4-propylbenzoate, methyl 3-amino-4-propylbenzoate, ethyl 2-amino-4-methylbenzoate, ethyl 2-amino-4-ethylbenzoate, methyl 2-amino-5-methylbenzoate, methyl 2-amino-5-ethylbenzoate, methyl 2-amino-5-propylbenzoate, methyl 2-amino-5-butylbenzoate, methyl 3-amino-5-propylbenzoate, ethyl 3-amino-4-pentylbenzoate, ethyl 2-amino-5-methylbenzoate, ethyl 2-amino-5-ethylbenzoate, ethyl 2-amino-5-propylbenzoate, ethyl 2-amino-5-butylbenzoate, methyl 2-amino-6-methylbenzoate, methyl 2-amino-6-propylbenzoate, ethyl 2-amino-6-methylbenzoate, ethyl 2-amino-6-ethylbenzoate, methyl 4-aminobenzoate, methyl 4-amino-3-methylbenzoate, methyl 4-amino-3-ethylbenzoate, methyl 4-amino-3-ethylbenzoate, methyl 4-amino-2-propylbenzoate, ethyl 4-aminobenzoate, ethyl 4-amino-2-propyl benzoate, ethyl 4-amino-3-propyl benzoate, propyl 4-aminobenzoate, butyl 4-aminobenzoate, pentyl 4-aminobenzoate, 3-methylbutyl 4-aminobenzoate, hexyl 4-aminobenzoate, 2-ethylhexyl 4-aminobenzoate, octyl 4-aminobenzoate, nonyl 4-aminobenzoate, decyl 4-aminobenzoate, dodecyl 4-aminobenzoate, methyl 2-(1-aminoethyl)benzoate, methyl 2-(1-aminopropyl)benzoate, methyl 2-(2-aminopropyl)benzoate, methyl 2-(1-aminobutyl)benzoate, methyl 2-(2-aminobutyl)benzoate, ethyl 4-(4-aminohexyl)benzoate, methyl 4-(1-aminoethyl)benzoate, methyl 4-(1-aminopropyl)benzoate, methyl 4-(1-aminobutyl)benzoate, methyl 4-(1-aminohexyl)benzoate, methyl 4-(2-aminoethyl)benzoate, methyl 4-(2-aminopropyl)benzoate, methyl 4-(2-aminobutyl)benzoate, methyl 4-(3-aminopropyl)benzoate, methyl 4-(3-aminobutyl)benzoate, methyl 4-(4-aminobutyl)benzoate, methyl 3-(2-aminoethyl)benzoate, methyl 3-(2-aminopropyl)benzoate, methyl 3-(2-aminobutyl)benzoate, methyl 3-(3-aminopropyl)benzoate, methyl 2-(1-aminoethyl)benzoate, methyl 2-(1-aminopropyl)benzoate, methyl 2-(1-aminobutyl)benzoate, methyl 3-(1-aminoethyl)benzoate, methyl 3-(1-aminopropyl)benzoate, methyl 3-(1-aminobutyl)benzoate, methyl 2-(2-aminoethyl)benzoate, methyl 2-(2-aminopropyl)benzoate, methyl 2-(2-aminobutyl)benzoate, methyl 2-(3-aminopropyl)benzoate, methyl 2-(4-aminobutyl)benzoate, ethyl 2-(3-aminopropyl)benzoate, ethyl 3-(3-aminopropyl)benzoate, ethyl 4-(3-aminopropyl)benzoate, ethyl 4-(4-aminobutyl)benzoate, ethyl-4-(4-aminohexyl)benzoate, ethyl 4-(2-aminopropyl)benzoate, ethyl 4-(1-aminobutyl)benzoate, or a combination thereof.

Embodiment 46

The method of any one of embodiments 34-37, wherein the reactive plasticizer comprises a $C_{1-12}$-alkyl anthranilate.

Embodiment 47

The method of any one of embodiments 34-37, wherein the reactive plasticizer comprises a $C_{1-12}$-n-alkyl anthranilate.

Embodiment 48

The method of any one of embodiments 34-37, wherein the reactive plasticizer comprises methyl anthranilate.

Embodiment 49

The method of any one of embodiments 34-37, wherein the reactive plasticizer comprises a $C_{1-12}$-alkyl 2-aminophenyl ketone.

Embodiment 50

The method of any one of embodiments 34-37, wherein the reactive plasticizer comprises an n-$C_{1-12}$-alkyl 2-aminophenyl ketone.

Embodiment 51

The method of any one of embodiments 34-37, wherein the reactive plasticizer comprises methyl 2-aminophenyl ketone.

Embodiment 52

The method of any one of embodiments 34-51, wherein the plasticizer further comprises glycerol, a $C_{1-12}$-alkyl benzoate, a $C_{1-12}$-alkyl phenone, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, a $C_{1-12}$-alkoxy phenol, benzyl alcohol, benzaldehyde, a $C_{1-12}$-alkyl phenylacetaldehyde, a $C_{1-12}$-alkyl benzaldehyde or a combination thereof.

Embodiment 53

The method of any one of embodiments 34-51, wherein the plasticizer further comprises a $C_{1-12}$-alkyl benzoate, a $C_{1-12}$-alkyl phenyl ketone, benzyl alcohol, benzaldehyde, a $C_{1-12}$-alkoxy phenol, or a combination thereof.

Embodiment 54

The method of any one of embodiments 34-53, wherein the hydrogen-bonded prepolymer and the plasticizer are present in amounts characterized by a ratio of moles of monomer equivalents of prepolymer to moles of plasticizer of 1:1 to 500:1.

Embodiment 55

The method of any one of embodiments 34-54, wherein the crosslinking agent is present and has a solubility of greater than or equal to 50 mg/mL in the plasticizer at 25° C.

Embodiment 56

The method of any one of embodiments 34-54, wherein the crosslinking agent is present and is hexamethylenetetramine, paraformaldehyde, a polyisocyanate, a multifunctional amine, an ethylenically unsaturated compound (e.g., a $C_{1-12}$-alkyl (meth)acrylate, styrene, styrene derivative, and the like) or a combination thereof.

Embodiment 57

The method of any one of embodiments 34-54, wherein the crosslinking agent is present and comprises hexamethylenetetramine.

Embodiment 58

The method of any one of embodiments 34-57, wherein the hydrogen-bonded prepolymer and the crosslinking agent are present in amounts characterized by a ratio of moles of monomer equivalents of prepolymer to moles of crosslinking agent of 2:1 to 135:1.

Embodiment 59

The method of any one of embodiments 34-57, wherein said reacting is conducted in the presence of a filler.

Embodiment 60

The method of embodiment 59, wherein the filler is aluminum silicate, calcium silicate, iron silicate, zirconium silicate, fused silica, natural silica sand, boron nitride powder or granules, boron silicate powder or granules, boric oxide, boron trioxide, titanium oxide, titanium diboride, zirconium diboride, aluminum oxide (alumina), aluminum oxynitride, antimony trisulfide, magnesium oxide, zirconium oxide, other metal oxides in which the metal is chromium, cobalt, copper, iron, molybdenum, nickel, palladium, platinum, potassium, sodium, tin, titanium, tungsten, zinc, an alloy thereof or a combination thereof, alumina-zirconia, boron-alumina, calcium sulfate, calcium carbonate, mica, clay, montmorillonite, sodio-montmorillonite saponite, hectorite, beidellite, stevensite, nontronite, vermiculite, halloysite, swelling micas, kaolinite, talc, wollastonite, hollow glass spheres, solid glass spheres, silicate spheres, cenospheres, kaolin, silicon carbide, diamond, boron carbide, boron nitride, aluminum, bronze, iron, nickel, copper, zinc, carbon fibers, glass fibers, quartz fibers, molybdenum sulfide, zinc sulfide, barium titanate, barium ferrite, barium sulfate, glass flakes, silicon carbide flakes, aluminum diboride flakes, poly(ether ketone) fibers, polyimide fibers, polybenzoxazole fibers, poly(phenylene sulfide) fibers, polyester fibers, polyethylene fibers, aromatic polyamide fibers, aromatic polyimide fibers, polyetherimide fibers, polytetrafluoroethylene fibers, acrylic resin fibers, poly(vinyl alcohol) fibers, feldspar, bauxite, chromite, dolomite, mullite, fillite, nepheline syenite, quartz, quartzite, pyrite, cryolite, perlite, tripoli, diatomaceous earth, carbon black, or a combination thereof.

Embodiment 61

The method of embodiment 59 or 60, wherein the filler is present at 10 to 900 parts by weight per 100 parts by weight of the hydrogen-bonded prepolymer.

Embodiment 62

The method of embodiment 34, wherein the hydrogen-bonded prepolymer comprises a phenol-formaldehyde prepolymer having a molar ratio of phenol to formaldehyde greater than 1:1; and wherein the reactive plasticizer comprises methyl anthranilate.

Embodiment 63

The method of embodiment 62, wherein the hydrogen-bonded prepolymer and the plasticizer are present in amounts characterized by a ratio of moles of monomer equivalents of prepolymer to moles of plasticizer of 1:1 to 267:1.

Embodiment 64

The method of embodiment 62, wherein the crosslinking agent is present and comprises hexamethylenetetramine.

Embodiment 65

The method of embodiment 64, wherein the hydrogen-bonded prepolymer and the crosslinking agent are present in amounts characterized by a ratio of moles of monomer equivalents of prepolymer to moles of crosslinking agent of 2:1 to 135:1.

Embodiment 66

A cured resin obtained by the method of any one of embodiments 34-65, or article comprising the cured resin obtained by the method of any one of embodiments 34-65.

Embodiment 67

A crosslinked resin, comprising: a hexamethylenetetramine-crosslinked phenol-formaldehyde resin; and a crosslinking structure derived from a reactive plasticizer having structure (I), (II), or (III) above, wherein X is —OR$^1$, —N(R$^1$)$_2$, —R$^4$—OR$^1$, or —R$^4$—N(R$^1$)$_2$, wherein R$^1$ is independently at each occurrence hydrogen or C$_{1-6}$ alkyl, and R$^4$ is C$_1$-12 alkylene; y is zero or 1; z is zero or 1; R$^2$ is C$_{1-12}$ alkyl; and R$^3$ is C$_{1-12}$ alkyl when z is 1, or R$^3$ is C$_{1-12}$ alkyl or H when z is zero. Preferably preferably R$^3$ is C$_{1-12}$ alkyl.

Embodiment 68

The crosslinked resin of embodiment 67, wherein the reactive plasticizer comprises methyl anthranilate.

Embodiment 69

An article comprising the crosslinked resin of any one of embodiments 66-68.

Embodiment 70

The curable composition of embodiment 1, wherein the hydrogen-bonded prepolymer comprises a phenol-formaldehyde prepolymer, and wherein the phenol-formaldehyde prepolymer has a molar ratio of phenol to formaldehyde greater than 1:1.

Embodiment 71

The curable composition of embodiment 70, wherein the reactive plasticizer is methyl anthranilate, ethyl anthranilate, 1-propyl anthranilate (propyl anthranilate, propyl 2-aminobenzoate), 2-propyl anthranilate (isopropyl anthranilate, isopropyl 2-aminobenzoate, propan-2-yl 2-aminobenzoate)), 1-butyl anthranilate (butyl anthranilate, butyl 2-aminobenzoate), 2-butyl anthranilate (isobutyl anthranilate, isobutyl 2-aminobenzoate, 2-methylpropyl 2-aminobenzoate), 1-pentyl anthranilate (pentyl 2-aminobenzoate), 2-pentyl anthranilate (2-pentyl 2-aminobenzoate), 3-pentyl anthranilate (3-pentyl 2-aminobenzoate), 3-methyl-1-butyl anthranilate (3-methylbutyl 2-aminobenzoate), 1-hexyl anthranilate (hexyl 2-aminobenzoate), 1-heptyl anthranilate (heptyl 2-aminobenzoate), 1-octyl anthranilate (octyl 2-aminobenzoate), 2-ethyl-1-hexyl anthranilate (2-ethylhexyl 2-aminobenzoate), 1-nonyl anthranilate (nonyl 2-aminobenzoate), 7-methyl-1-octyl anthranilate (7-methyloctyl 2-aminobenzoate), 1-decyl anthranilate (decyl 2-aminobenzoate), cyclohexyl anthranilate (cyclohexyl 2-aminobenzoate), menthyl anthranilate (menthyl 2-aminobenzoate), methyl 2-amino-3-methylbenzoate, methyl 2-amino-3-ethylbenzoate, methyl 2-amino-3-propylbenzoate, methyl 2-amino-3-isopropylbenzoate, methyl 2-amino-3-butylbenzoate, ethyl 2-amino-3-methylbenzoate, ethyl 2-amino-3-ethylbenzoate, ethyl 2-amino-3-propylbenzoate, propyl 2-amino-3-methylbenzoate, propyl 2-amino-3-ethylbenzoate, propyl 2-amino-3-propylbenzoate, butyl 2-amino-3-methylbenzoate, pentyl 2-amino-3-methylbenzoate, hexyl 2-amino-3-methylbenzoate, heptyl 2-amino-3-methylbenzoate, 2-ethylhexyl 2-amino-3-methylbenzoate, octyl 2-amino-3-methylbenzoate, nonyl 2-amino-3-methylbenzoate, decyl 2-amino-3-methylbenzoate, methyl 3-aminobenzoate, ethyl 3-aminobenzoate, propyl 3-aminobenzoate, butyl 3-aminobenzoate, 3-methylbutyl 3-aminobenzoate, pentyl 3-aminobenzoate, hexyl 3-aminobenzoate, heptyl 3-aminobenzoate, 2-ethylhexyl 3-aminobenzoate, octyl 3-aminobenzoate, nonyl 3-aminobenzoate, decyl 3-aminobenzoate, dodecyl 3-aminobenzoate, methyl 2-amino-4-methylbenzoate, methyl 2-amino-4-ethylbenzoate, methyl 2-amino-4-propylbenzoate, methyl 3-amino-4-propylbenzoate, ethyl 2-amino-4-methylbenzoate, ethyl 2-amino-4-ethylbenzoate, methyl 2-amino-5-methylbenzoate, methyl 2-amino-5-ethylbenzoate, methyl 2-amino-5-propylbenzoate, methyl 2-amino-5-butylbenzoate, methyl 3-amino-5-propylbenzoate, ethyl 3-amino-4-pentylbenzoate, ethyl 2-amino-5-methylbenzoate, ethyl 2-amino-5-ethylbenzoate, ethyl 2-amino-5-propylbenzoate, ethyl 2-amino-5-butylbenzoate, methyl 2-amino-6-methylbenzoate, methyl 2-amino-6-propylbenzoate, ethyl 2-amino-6-methylbenzoate, ethyl 2-amino-6-ethylbenzoate, methyl 4-aminobenzoate, methyl 4-amino-3-methylbenzoate, methyl 4-amino-3-ethylbenzoate, methyl 4-amino-3-ethylbenzoate, methyl 4-amino-2-propylbenzoate, ethyl 4-aminobenzoate, ethyl 4-amino-2-propyl benzoate, ethyl 4-amino-3-propyl benzoate, propyl 4-aminobenzoate, butyl 4-aminobenzoate, pentyl 4-aminobenzoate, 3-methylbutyl 4-aminobenzoate, hexyl 4-aminobenzoate, 2-ethylhexyl 4-aminobenzoate, octyl 4-aminobenzoate, nonyl 4-aminobenzoate, decyl 4-aminobenzoate, dodecyl 4-aminobenzoate, methyl 2-(1-aminoethyl)benzoate, methyl 2-(1-aminopropyl)benzoate, methyl 2-(2-aminopropyl)benzoate, methyl 2-(1-aminobutyl)benzoate, methyl 2-(2-aminobutyl)benzoate, ethyl 4-(4-aminohexyl)benzoate, methyl 4-(1-aminoethyl)benzoate, methyl 4-(1-aminopropyl)benzoate, methyl 4-(1-aminobutyl)benzoate, methyl 4-(1-aminohexyl)benzoate, methyl 4-(2-aminoethyl)benzoate, methyl 4-(2-aminopropyl)benzoate, methyl 4-(2-aminobutyl)benzoate, methyl 4-(3-aminopropyl)benzoate, methyl 4-(3-aminobutyl)benzoate, methyl 4-(4-aminobutyl)benzoate, methyl 3-(2-aminoethyl)benzoate, methyl 3-(2-aminopropyl)benzoate, methyl 3-(2-aminobutyl)benzoate, methyl 3-(3-aminopropyl)benzoate, methyl 2-(1-aminoethyl)benzoate, methyl 2-(1-aminopropyl)benzoate, methyl 2-(1-aminobutyl)benzoate, methyl 3-(1-aminoethyl)benzoate, methyl 3-(1-aminopropyl)benzoate, methyl 3-(1-aminobutyl)benzoate, methyl 2-(2-aminoethyl)benzoate, methyl 2-(2-aminopropyl)benzoate, methyl 2-(2-aminobutyl)benzoate, methyl 2-(3-aminopropyl)benzoate, methyl 2-(4-aminobutyl)benzoate, ethyl 2-(3-aminopropyl)benzoate, ethyl 3-(3-aminopropyl)benzoate, ethyl 4-(3-aminopropyl)benzoate, ethyl 4-(4-aminobutyl)benzoate, ethyl-4-(4-aminohexyl)benzoate, ethyl 4-(2-aminopropyl)benzoate, ethyl 4-(1-aminobutyl)benzoate, or a combination thereof.

Embodiment 72

The curable composition of embodiment 71, wherein the reactive plasticizer comprises a $C_{1-12}$-alkyl anthranilate, or a $C_{1-12}$-n-alkyl anthranilate, or methyl anthranilate.

Embodiment 73

The curable composition of any one of embodiment s 70-71, wherein the reactive plasticizer comprises a $C_{1-12}$-alkyl 2-aminophenyl ketone, or an n-$C_{1-12}$-alkyl 2-aminophenyl ketone, or methyl 2-aminophenyl ketone.

Embodiment 74

The curable composition of any one of embodiments 70-73, further comprising an additional plasticizer; wherein the additional plasticizer comprises glycerol, a $C_{1-12}$-alkyl benzoate, a $C_{1-12}$-alkyl phenyl ketone, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, a $C_{1-12}$-alkoxy phenol, benzyl alcohol, benzaldehyde, a $C_{1-12}$-alkyl phenylacetaldehyde, a $C_{1-12}$-alkyl benzaldehyde or a combination thereof.

Embodiment 75

The curable composition of any one of embodiment s 70-74, comprising the hydrogen-bonded prepolymer and the plasticizer in amounts characterized by a ratio of moles of monomer equivalents of prepolymer to moles of plasticizer of 1:1 to 500:1.

Embodiment 76

The curable composition of any one of embodiment s 70-75, wherein the crosslinking agent is present, and the crosslinking agent has a solubility greater than or equal to 50 mg/mL in the plasticizer at 25° C., wherein the crosslinking agent comprises hexamethylenetetramine, paraformaldehyde, a polyisocyanate, a multifunctional amine, or a combination thereof, or wherein the crosslinking agent comprises hexamethylenetetramine.

Embodiment 77

The curable composition of any one of embodiment s 70-76, comprising the hydrogen-bonded prepolymer and the crosslinking agent in amounts characterized by a ratio of moles of monomer equivalents of prepolymer to moles of crosslinking agent of 2:1 to 135:1.

Embodiment 78

The curable composition of any one of embodiment s 70-77, further comprising a filler, in an amount of 10 to 900 parts by weight filler per 100 parts by weight hydrogen-bonded prepolymer.

Embodiment 79

The curable composition of embodiment 70, wherein the hydrogen-bonded prepolymer comprises a phenol-formaldehyde prepolymer having a molar ratio of phenol to formaldehyde greater than 1:1; wherein the reactive plasticizer comprises methyl anthranilate in a ratio of moles of monomer equivalents of prepolymer to moles of plasticizer of 1:1 to 500:1; wherein the composition comprises the crosslinking agent, and wherein the crosslinking agent comprises hexamethylenetetramine in amounts characterized by a ratio of moles of monomer equivalents of prepolymer to moles of crosslinking agent of 2:1 to 135:1.

Embodiment 80

A method of forming a cured resin, the method comprising curing the curable composition of any one of embodiments 70-79.

Embodiment 81

A cured resin obtained by the method of embodiment 80.

Embodiment 82

An article comprising the cured resin of embodiment 81.

Embodiment 83

A crosslinked resin, comprising: a hexamethylenetetramine-crosslinked phenol-formaldehyde resin; and a crosslinking structure derived from a reactive plasticizer having structure (I), (II), or (III) above, wherein X is —OR$^1$, —N(R$^1$)$_2$, —R$^4$—OR$^1$, or —R$^4$—N(R$^1$)$_2$, wherein R$^1$ is independently at each occurrence hydrogen or C$_{1-6}$ alkyl, and R$^4$ is C$_1$-12 alkylene; y is zero or 1; z is zero or 1; R$^2$ is C$_{1-12}$ alkyl; and R$^3$ is C$_{1-12}$ alkyl when z is 1, or R$^3$ is C$_{1-12}$ alkyl or H when z is zero, preferably R$^3$ is C$_{1-12}$ alkyl.

Embodiment 84

The crosslinked resin of embodiment 83, wherein the plasticizer further comprises an additional plasticizer that is glycerol, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, a C$_{1-12}$-alkoxy phenol, benzaldehyde, benzyl alcohol, a C$_{1-12}$-alkyl phenylacetaldehydes, C$_{1-12}$-alkyl benzaldehyde, or a combination thereof, preferably wherein the additional plasticizer comprises methyl anthranilate.

Embodiment 85

An article comprising the crosslinked resin of any one of embodiments 83-84.

All ranges disclosed herein are inclusive of the endpoints, and the endpoints are independently combinable with each other. Each range disclosed herein constitutes a disclosure of any point or sub-range lying within the disclosed range.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context.

The term "aliphatic group" means a saturated or unsaturated linear or branched hydrocarbon group. An aliphatic group may be an alkyl, alkenyl, or alkynyl group, for example.

The endpoints of all ranges directed to the same component or property are inclusive of the endpoints, are independently combinable, and include all intermediate points. For example, ranges of up to 25 wt. %, or more specifically 5 to 20 wt. % is inclusive of the endpoints and all intermediate values of the ranges of 5 to 25 wt. %, such as 10 to 23 wt. %.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

Unless defined otherwise, technical and scientific terms used herein have the same meaning as is commonly understood by one of skill in the art to which this disclosure belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A curable composition, comprising:
   a hydrogen-bonded prepolymer, wherein the hydrogen-bonded prepolymer comprises a phenol-formaldehyde prepolymer, aniline-formaldehyde prepolymer, urea-formaldehyde prepolymer, phenolic hydroxyl containing epoxy prepolymer, cresol-aldehyde prepolymer, resorcinol-aldehyde prepolymer, urea-aldehyde prepolymer, melamine-formaldehyde prepolymer, polyester, polyimide, polyurethane, epoxy resin, or a combination thereof;
   a plasticizer; and
   optionally, a crosslinking agent;
   wherein the plasticizer comprises a reactive plasticizer having structure (I), (II), or (III),

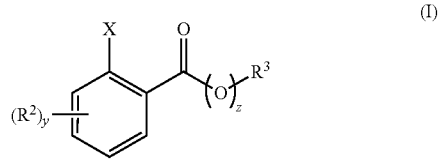

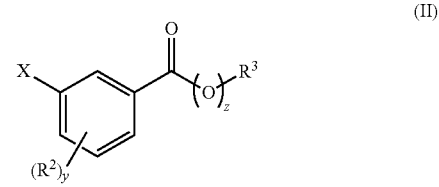

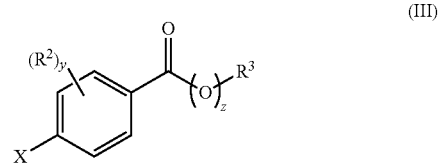

wherein
X is —OR$^1$, —N(R$^1$)$_2$, —R$^4$—OR$^1$, or —R$^4$—N(R$^1$)$_2$, wherein R$^1$ is independently at each occurrence hydrogen or C$_{1-6}$ alkyl, and R$^4$ is C$_{1-12}$ alkylene;
y is zero or 1;
z is zero or 1;
R$^2$ is C$_{1-12}$ alkyl; and
R$^3$ is C$_{1-12}$ alkyl when z is 1, or R$^3$ is C$_{1-12}$ alkyl or H when z is zero.

2. The curable composition of claim 1, wherein the hydrogen-bonded prepolymer comprises a phenol-formaldehyde prepolymer.

3. The curable composition of claim 2, wherein the phenol-formaldehyde prepolymer has a molar ratio of phenol to formaldehyde greater than 1:1.

4. The curable composition of claims 1, wherein the reactive plasticizer has structure (I).

5. The curable composition of claim 1, wherein each occurrence of X is —N(R$^1$)$_2$.

6. The curable composition of claim 5, wherein each occurrence of R$^1$ is hydrogen.

7. The curable composition of claim 1, wherein y is zero.

8. The curable composition of claim 1, wherein y is 1.

9. The curable composition of claim 1, wherein z is zero.

10. The curable composition of claim 1, wherein the reactive plasticizer comprises a C$_{1-12}$-alkyl anthranilate.

11. The curable composition of claim 1, wherein the reactive plasticizer comprises a C$_{1-12}$-n-alkyl anthranilate.

12. The curable composition of claim 1, wherein the reactive plasticizer comprises methyl anthranilate.

13. The curable composition of claim 1, wherein the reactive plasticizer comprises a C$_{1-12}$-alkyl 2-aminophenyl ketone.

14. The curable composition of claim 1, wherein the reactive plasticizer comprises an n-C$_{1-12}$-alkyl 2-aminophenyl ketone.

15. The curable composition of claim 1, wherein the reactive plasticizer comprises methyl 2-aminophenyl ketone.

16. The curable composition of claim 1, further comprising an additional plasticizer; wherein the additional plasticizer comprises glycerol, a C$_{1-12}$-alkyl benzoate, a C$_{1-12}$-alkyl phenyl ketone, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, a C$_{1-12}$-alkoxy phenol, benzyl alcohol, benzaldehyde, a C$_{1-12}$-alkyl phenylacetaldehyde, a C$_{1-12}$-alkyl benzaldehyde, or a combination thereof.

17. The curable composition of claim 1, further comprising a C$_{1-12}$-alkyl benzoate, a C$_{1-12}$-alkyl phenyl ketone, benzyl alcohol, benzaldehyde, a C$_{1-12}$-alkoxy phenol, or a combination thereof.

18. The curable composition of claim 1, comprising the hydrogen-bonded prepolymer and the plasticizer in amounts characterized by a ratio of moles of monomer equivalents of prepolymer to moles of plasticizer of 1:1 to 500:1.

19. The curable composition of claim 1, wherein the crosslinking agent is present and has a solubility greater than or equal to 50 milligrams/milliliter in the plasticizer at 25° C.

20. The curable composition of claim 1, wherein the crosslinking agent is present and comprises hexamethylenetetramine, paraformaldehyde, a polyisocyanate, a diisocyanate, a multifunctional amine, a diamine, an ethylenically unsaturated compound, or a combination thereof.

21. The curable composition of claim 1, wherein the crosslinking agent is present and comprises hexamethylenetetramine.

22. The curable composition of claim 1, comprising the hydrogen-bonded prepolymer and the crosslinking agent in amounts characterized by a ratio of moles of monomer equivalents of prepolymer to moles of crosslinking agent of 2:1 to 135:1.

23. The curable composition of claim 1, further comprising a filler.

24. The curable composition of claim 23, comprising 10 to 900 parts by weight filler per 100 parts by weight of the hydrogen-bonded prepolymer.

25. The curable composition of claim 1,
wherein the hydrogen-bonded prepolymer comprises a phenol-formaldehyde prepolymer having a molar ratio of phenol to formaldehyde greater than 1:1; and
wherein the reactive plasticizer comprises methyl anthranilate; and
comprising the hydrogen-bonded prepolymer and the plasticizer in amounts characterized by a ratio of moles of monomer equivalents of prepolymer to moles of plasticizer of 1:1 to 500:1.

26. The curable composition of claim 25, wherein the composition comprises the crosslinking agent, and wherein the crosslinking agent comprises hexamethylenetetramine, and the hydrogen-bonded prepolymer and hexamethylenetetramine in amounts characterized by a ratio of moles of monomer equivalents of prepolymer to moles of crosslinking agent of 2:1 to 135:1.

27. A crosslinked resin, comprising:
a hexamethylenetetramine-crosslinked phenol-formaldehyde resin; and
a crosslinking structure derived from a reactive plasticizer having structure (I), (II), or (III),

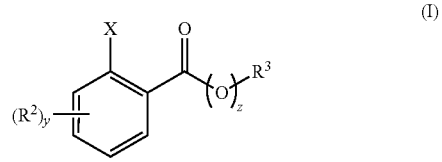

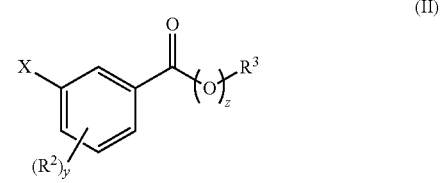

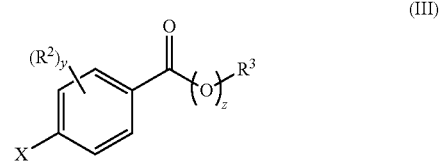

wherein X is —OR$^1$, —N(R$^1$)$_2$, —R$^4$—OR$^1$, or —R$^4$—N(R$^1$)$_2$, wherein R$^1$ is independently at each occurrence hydrogen or C$_{1-6}$ alkyl, and R$^4$ is C$_{1-12}$ alkylene;
y is zero or 1;
z is zero or 1;
R$^2$ is C$_{1-12}$ alkyl; and
R$^3$ is C$_{1-12}$ alkyl when z is 1, or R$^3$ is C$_{1-12}$ alkyl or H when z is zero.

28. The crosslinked resin of claim 27, further comprising an additional plasticizer, wherein the additional plasticizer comprises glycerol, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, a $C_{1-12}$-alkoxy phenol, methyl anthranilate, benzaldehyde, benzyl alcohol, a $C_{1-12}$-alkyl phenylacetaldehyde, a $C_{1-12}$-alkyl benzaldehyde, or a combination thereof.

29. The crosslinked resin of claim 28, wherein the additional plasticizer comprises methyl anthranilate.

30. An article comprising the crosslinked resin of claim 27.

* * * * *